US010219142B2

(12) United States Patent
Yoshida et al.

(10) Patent No.: US 10,219,142 B2
(45) Date of Patent: Feb. 26, 2019

(54) NEIGHBOR DISCOVERY AND NEIGHBOR SELECTION OF MESH NETWORK DEVICES IN A MESH NETWORK

(71) Applicant: Amazon Technologies, Inc., Seattle, WA (US)

(72) Inventors: Lori Yoshida, Santa Clara, CA (US); Varadarajan Gopalakrishnan, Cupertino, CA (US); Sheung Mei Chan, Santa Clara, CA (US); Avinash Joshi, San Jose, CA (US); Andrew David Price, Santa Clara, CA (US); Jungtao Liu, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 8 days.

(21) Appl. No.: 15/595,479

(22) Filed: May 15, 2017

(65) Prior Publication Data

US 2018/0331914 A1  Nov. 15, 2018

(51) Int. Cl.
*H04W 8/00* (2009.01)
*H04W 4/80* (2018.01)
(Continued)

(52) U.S. Cl.
CPC .............. *H04W 8/005* (2013.01); *H04B 7/04* (2013.01); *H04W 4/80* (2018.02); *H04W 76/14* (2018.02); *H04W 84/18* (2013.01)

(58) Field of Classification Search
CPC ......... H04W 76/14; H04W 8/005; H04B 7/04
See application file for complete search history.

(56) References Cited

U.S. PATENT DOCUMENTS

2006/0215624 A1  9/2006  Adya et al.
2009/0129323 A1*  5/2009  Chen ................... H04W 40/246
                                                370/329
(Continued)

FOREIGN PATENT DOCUMENTS

WO  2015/138914 A1  9/2015

OTHER PUBLICATIONS

International Search Report and Written Opinion dated Aug. 3, 2017, on application No. PCT/US2017/033662.
(Continued)

*Primary Examiner* — Gary Mui
(74) *Attorney, Agent, or Firm* — Lowenstein Sandler LLP

(57) ABSTRACT

Network hardware devices organized in a wireless mesh network (WMN) in which one network hardware devices includes multiple radios. A processing device of a first network hardware device receives, via a first radio, a beacon frame from a second mesh network device, scans, via a second radio, for a second mesh frame of the second mesh network device, and receives the mesh frame. The processing device determines a first sector identifier that identifies an antenna from which the mesh frame is transmitted, a first signal strength indicator value corresponding to the mesh frame, an unused radio and an unused channel of the second mesh network device. The processing device sends a first message to the unused radio of the second mesh network device on the unused channel via the second radio, receives a second message, and configures the multiple radios to communicate with the second mesh network device.

20 Claims, 14 Drawing Sheets

(51) Int. Cl.
*H04W 76/14* (2018.01)
*H04B 7/04* (2017.01)
*H04W 84/18* (2009.01)

(56) References Cited

U.S. PATENT DOCUMENTS

| | | | |
|---|---|---|---|
| 2010/0150077 A1* | 6/2010 | Nanda | H01Q 1/246 370/328 |
| 2013/0176960 A1* | 7/2013 | Franklin | H04W 72/046 370/329 |
| 2015/0223088 A1 | 8/2015 | Niu et al. | |
| 2017/0079001 A1 | 3/2017 | Lewis | |
| 2017/0086211 A1 | 3/2017 | Sahin et al. | |
| 2017/0366956 A1* | 12/2017 | Yoshida | H04L 5/006 |

OTHER PUBLICATIONS

Das SM, Pucha H, Koutsonikolas D, Hu YC, Peroulis D. DMesh: incorporating practical directional antennas in multichannel wireless mesh networks. IEEE Journal on selected areas in communications. Nov. 2006;24(11):2028-39.

Choudhury RR, Vaidya NH. Performance of ad hoc routing using directional antennas. Ad Hoc Networks. Mar. 31, 2005;3(2):157-73.

* cited by examiner

NEIGHBOR DISCOVERY AND NEIGHBOR SELECTION OF MESH NETWORK DEVICES IN A MESH NETWORK

RELATED APPLICATIONS

This application is related to U.S. application Ser. No. 15/188,831, filed Jun. 21, 2016.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
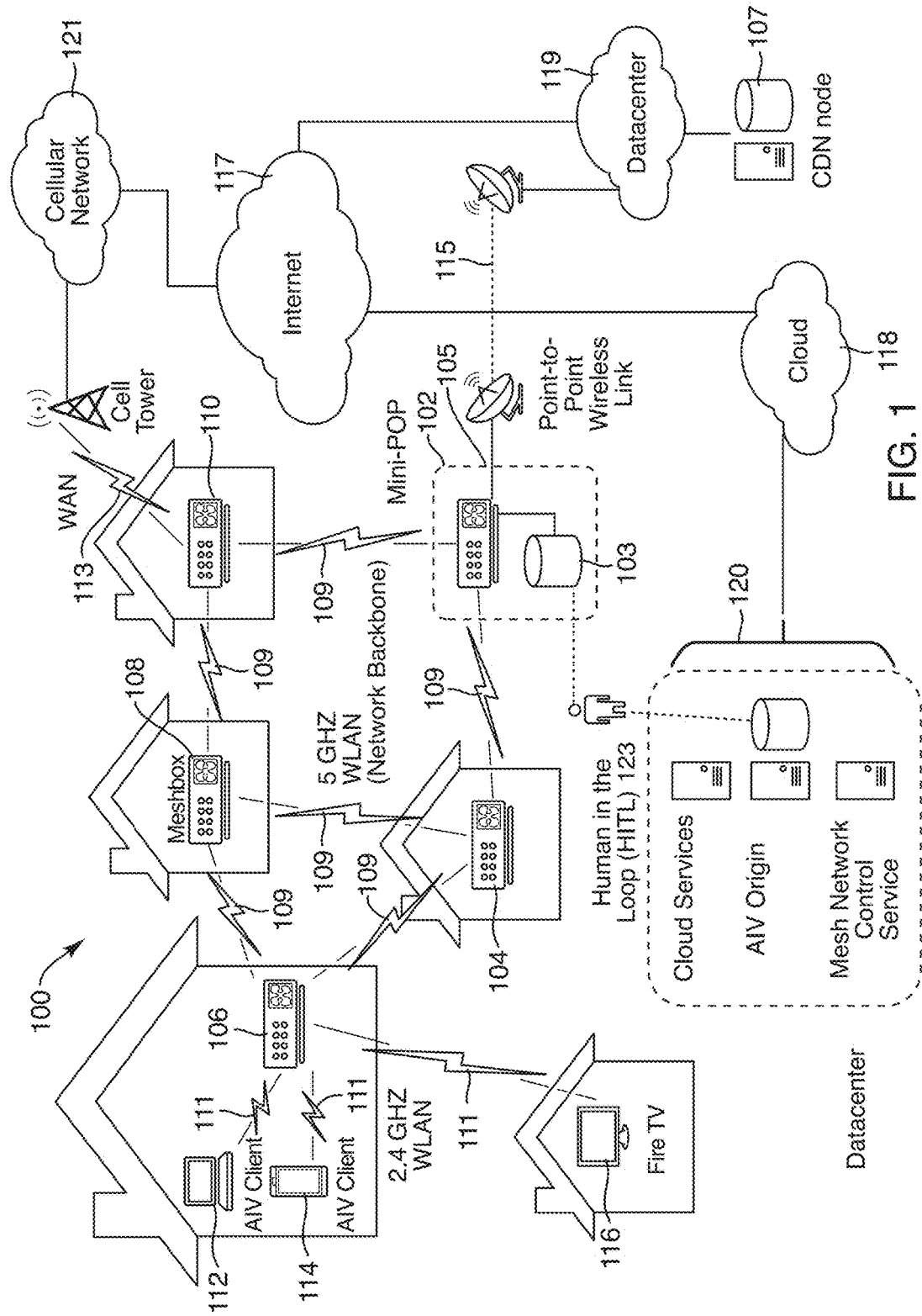
FIG. 1 is a network diagram of network hardware devices organized in a wireless mesh network (WMN) for content distribution to client devices in an environment of limited connectivity to broadband Internet infrastructure according to one embodiment.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

Described herein are embodiments directed to neighbor discovery, neighbor selection, and neighbor replacement of mesh network devices in the WMN. In some cases, a processing device of a first network hardware device receives, via a first radio, a beacon frame (e.g., a 2.4 GHz frequency beacon frame, also referred to herein as an access point (AP) beacon frame) from a second mesh network device, scans, via a second radio, for a mesh frame (e.g., a 5 GHz frequency mesh frame) of the second mesh network device, and receives the second mesh frame. In one embodiment, a mesh frame is a unicast data frame sent from one mesh network device to another mesh network device. A beacon frame may be a broadcast data frame send from a mesh network device at regular intervals. In one embodiment, "scanning" may include activating a particular channel of all or a portion of the radios of a network hardware device and actively listening for a data frame on that channel. The processing device determines a first sector identifier (ID) that identifies an antenna from which the second mesh frame (e.g., response frame, corresponding mesh frame, etc.) is transmitted, a first signal strength indicator corresponding to the second mesh frame, an unused radio and an unused channel of the second mesh network device. In one embodiment, a sector identifier may identify the antenna by a MAC address of a radio corresponding to a sector including the antenna. The processing device sends, via the second radio, a first message to the unused radio of the second mesh network device via the unused channel, receives a second message, and configures the multiple radios to communicate with the second mesh network device.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a mesh network control service (MNCS) device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIGS. 1-4A are generally directed to network hardware devices, organized in a wireless mesh network, for content distribution to client consumption devices in environments of limited connectivity to broadband internet infrastructure. The embodiments described herein may be deployed in these network hardware devices. FIG. 4B-9 are generally directed to neighbor discovery, neighbor selection, and neighbor replacement for mesh network devices in the WMN for routing traffic on a network backbone of the WMN.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The network hardware devices 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, when line of sight is required for the directional microwave link, terrain or building may be constraints on the line of sight. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
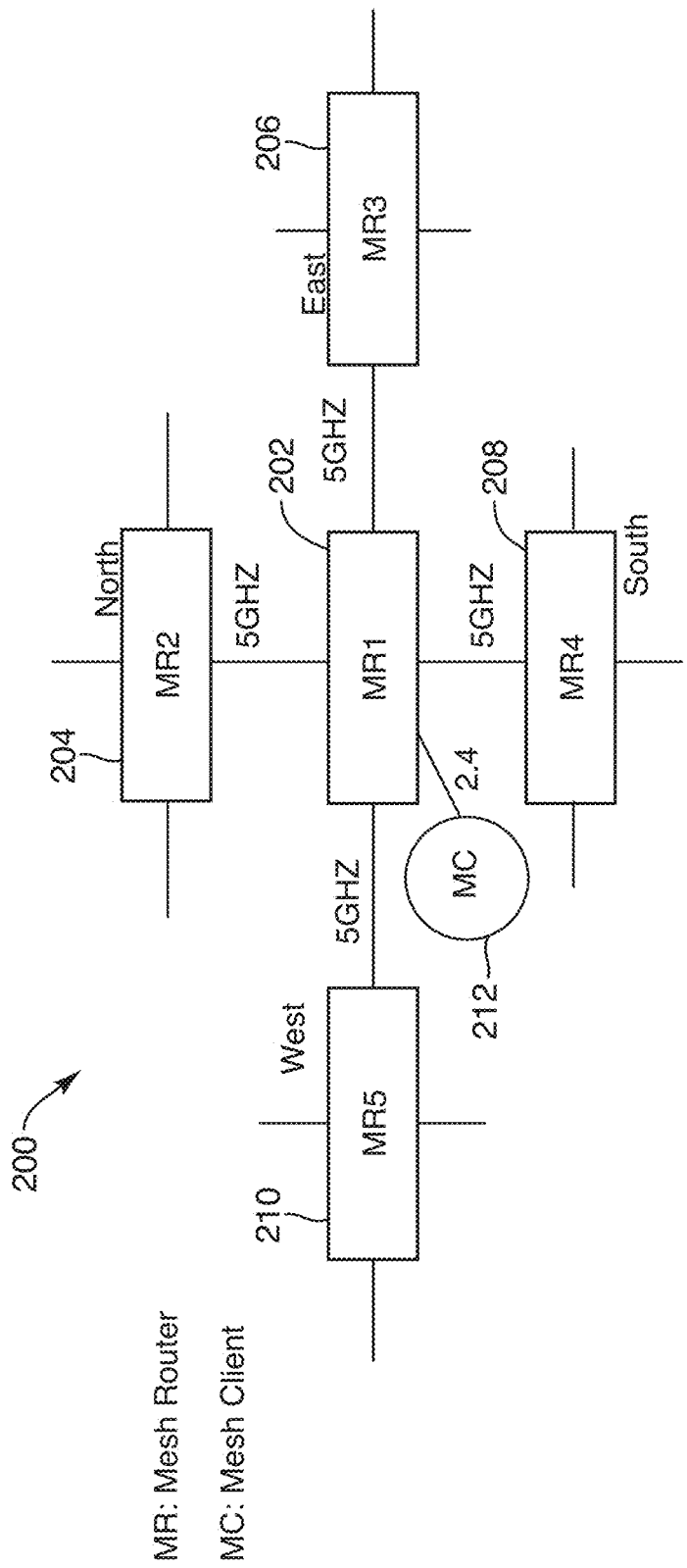
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
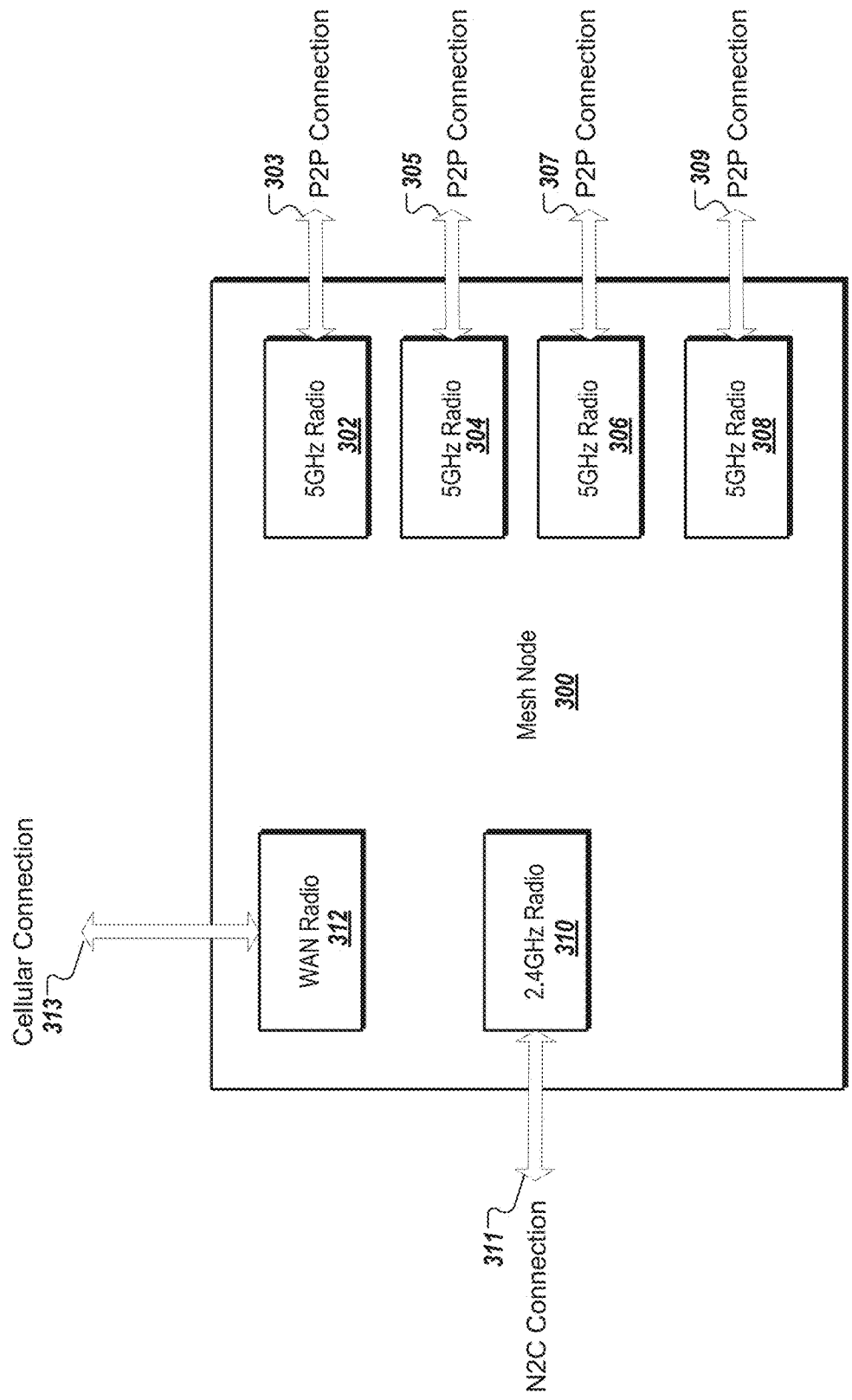
FIG. 3 is a block diagram of a mesh node with multiple radios according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection.

The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory or in persistent storage of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and a mesh network control service (MNCS) device.

In one embodiment, the second radio can operate with 2×2 MIMO with maximum 40 MHz aggregation. This may result in per radio throughput of not more than 300 Mbps in 5 GHz and 150 Mbps in 2.4 GHz. Even with 5 radios (4×5 GHz and 1×2.4), the peak physical layer throughput will not need to be more than 1.4 Gbps. For example, a scaling factor of 1.4 may be used to arrive at a CPU frequency requirement. This implies the total processing clock speed in the CPU should not be less than 1.96 GHz (1.4×1.4=1.96 GHz). For example, the Indian ISM band has a requirement of 23 dBm EIRP. Since the WMN 100 needs to function under conditions where the mesh routers communicate with each other between homes, the propagation loss through multiple walls and over distances between homes, the link budget does not support sensitivity requirements for 802.11ac data rates. The per-node throughput may be limited to 300 Mbps per link—peak PHY rate. It should be noted that the scaling factor of 1.4 is just an example. In other cases, the scaling factor can be determined by a lot of factors, such as CPU architecture, number of cores, Wi-Fi® target offloading mode, NPU offload engine, software forwarding layers (L2 vs L3), or the like.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

Figure 4A:
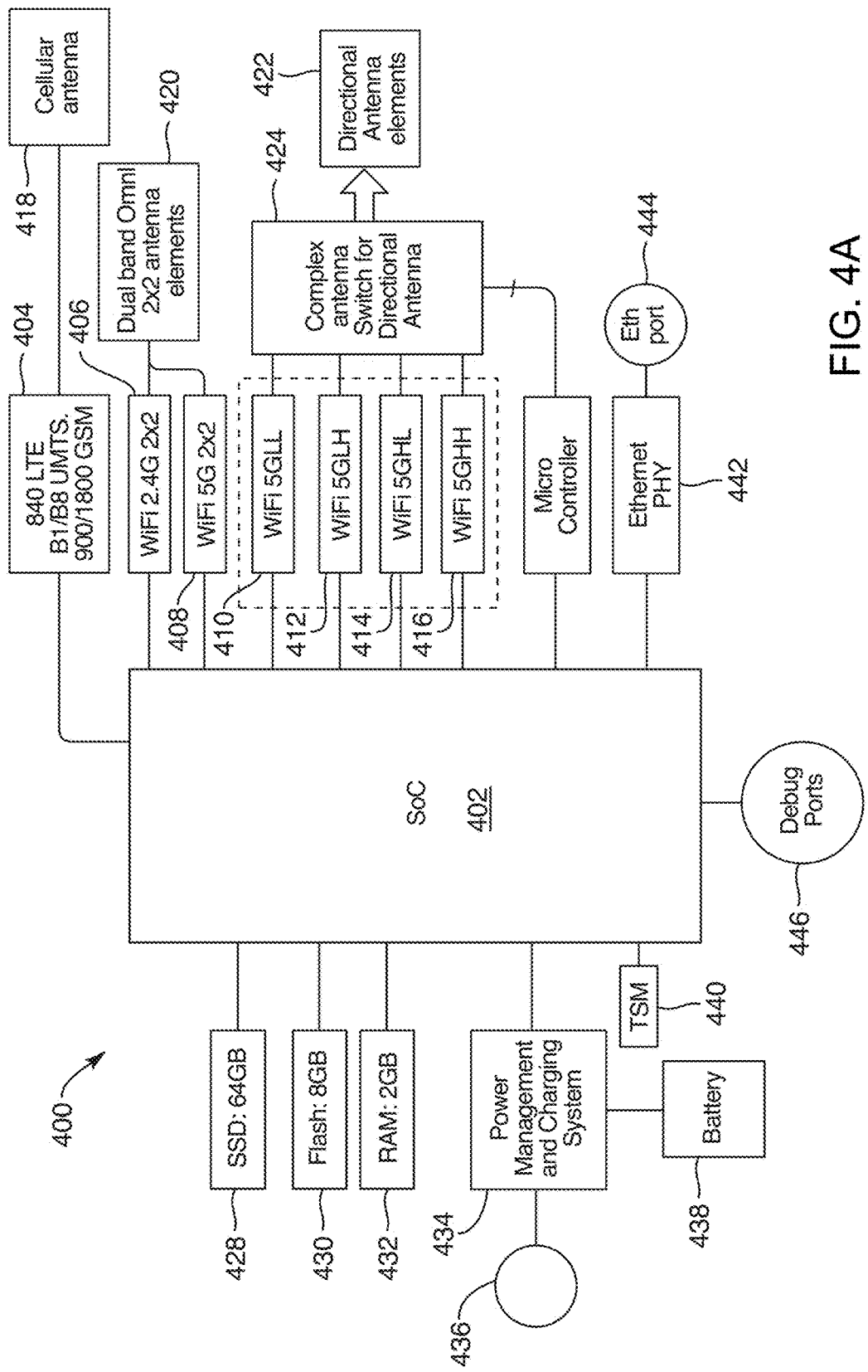
FIG. 4A is a block diagram of a mesh network device according to one embodiment.

FIG. 4A is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be four sector directional antennas (e.g., four antennas) for 5 GHz. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422. The antenna switching circuitry 424 is described in more detail below with respect to FIGS. 5-7.

In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first a first 2×2 2.4 GHz MIMO radio 406 and a 2×2 5 GHz MIMO radio 408. The second set of WLAN modules includes a first 2×2 5 GHz MIMO radio 410 ("5GLL"), a second 2×2 5 GHz MIMO radio 412 ("5GLH"), a third 2×2 5 GHz MIMO radio 414 ("5GHL"), and a fourth 2×2 5 GHz MIMO radio 416 ("5GHH"). The dual-band omnidirectional antennas 420 may include a first omnidirectional antenna and a second omnidirectional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna). In one embodiment, four directional antennas may be coupled to one radio each with two additional directional antennas selectively couple-able to the four radios.

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

In one embodiment, the antenna switching circuitry 424 includes multiple diplexers and switches to connect different combinations of antennas to the multiple radios. FIGS. 5-7 illustrate three different architectures for the antenna switching circuitry 424. The following diagrams use the following notations for reference:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

FIG. 4B-9 are generally directed to neighbor discovery, neighbor selection, and neighbor replacement for mesh network devices in the WMN for routing traffic on a network backbone of the WMN.

Figure 4B:
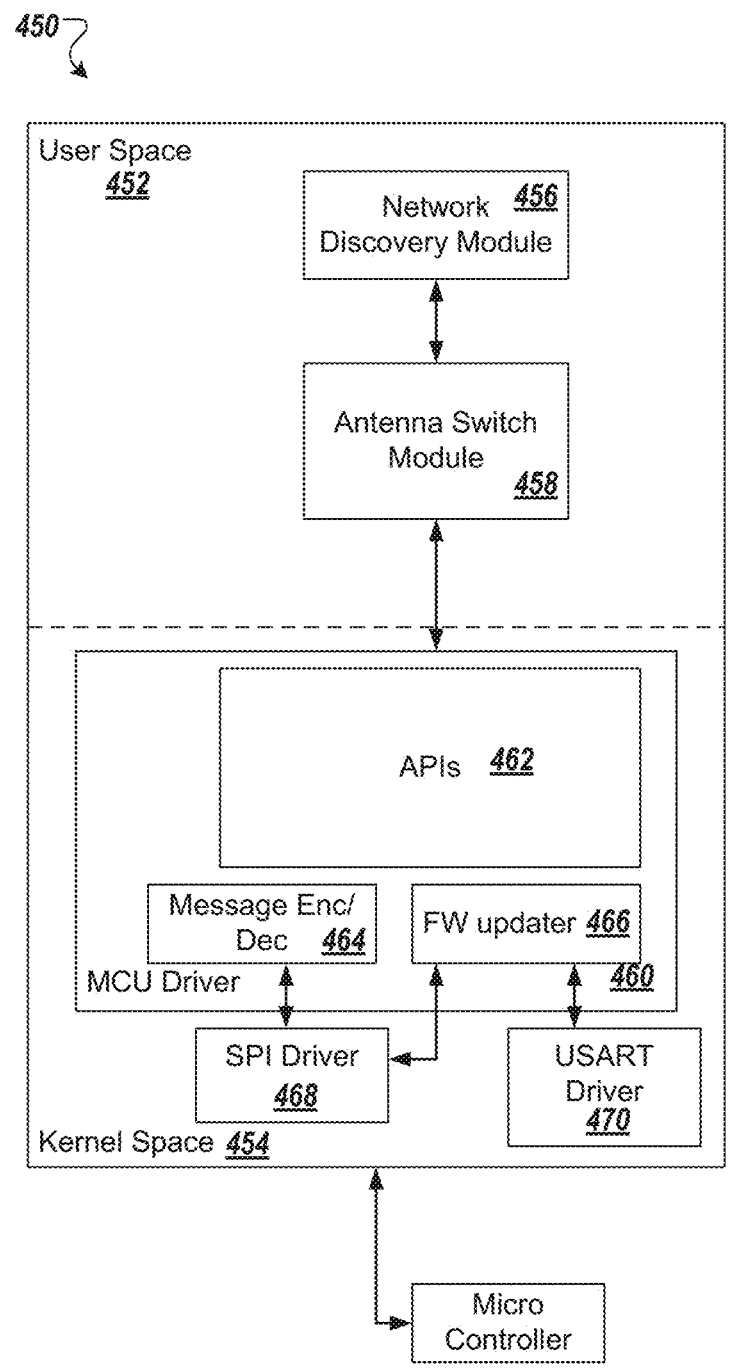
FIG. 4B is a block diagram of an application processor in which a network discovery module may be implemented according to one embodiment.

FIG. 4B is a block diagram of an application processor in which a network discovery module 456 may be implemented according to one embodiment. The application processor 450 executes an operating system that segregates memory (virtual memory) into user space 452 and kernel space 454. In this embodiment, the network discovery module 456 and antenna switching module 458 execute in the user space 452. The network discovery module 456 may be instructions that when executed by the application processor 450 perform various operations as described below with respect to FIGS. 6-9. The network discovery module 456 can instruct the antenna switch module 458 to control one or more radios to communicate with other mesh network devices in connection with a neighbor discovery process, a neighbor selection process, a neighbor replacement process, or any similar process. Once the mesh network devices in the mesh network are discovered and selected, the application processor 450 can communicate with other neighbor mesh network devices to route data traffic on a network backbone of multiple P2P wireless connections between the mesh network devices. In other embodiments, some of the entire network discovery module 456 can be implemented in the kernel space.

In the kernel space 454, a micro controller unit (MCU) driver 460 can execute. The MCU driver 460 may include multiple application programming interfaces (APIs) 462 to interface to other components, such as the radios and micro controller, as described herein. The APIs 462 can communicate messages to other components and may use a message encoder/decoder 464 to encode and decode these messages. The APIs 462 may include an API for getting firmware versions, an API for updating the firmware, and an API for getting radio information (e.g., radio configuration, antenna configuration, channel information, chamber/sector information, or the like. The MCU driver 460 may also include a firmware (FW) updater 466. Also, in the kernel space 454, a serial packet interface (SPI) driver 468 and a Universal Synchronous/Asynchronous Receiver/Transmitter (USART) driver 470.

In one embodiment, there is an interface mechanism between the user space 452 and kernel space 454 that has minimum latency. For example, in cases when there is an invalid configuration being input by an application, such as the antenna switch module 458, the error should be reported as quickly as possible to the application. The application processor 450 may also include power management modules in the user space 452 or in the kernel space 454 since the application processor 450 could be operating in a battery-backed operating state during power outages.

In one embodiment, the SPI driver 468 can be used for messaging between the application processor 450 and the micro controller and the USART driver 470 can be used for firmware updates. The application processor 450 can use general purpose input-output (GPIO) interrupts to drive antenna switching. The switching could even be done on a per-packet basis. The application processor 450 can store any configuration, such as GPIO configurations in non-volatile memory.

The following description is directed to network discovery and network selection of neighboring mesh network devices with an example of a mesh network device having four radios with antennas in 6 sectors; four horizontal sectors and two vertical sectors. For example, when a mesh network device boots up, the mesh network device needs to find its neighbor mesh network devices. The mesh network device scans omnidirectionally over 2.4 GHz for access point (AP) beacon frames that contain an information element (IE, ID, etc.) that identifies a mesh network device, such as having a specific vendor identifier. In one embodiment, beacon frames are continually (e.g., at a defined interval) broadcast from mesh network devices. A separate ID (multiple separate IDs) corresponding to multiple mesh network devices may be identified and stored. The mesh network device determines where each of those neighbors is located and therefore which of its directional antennas may be used to reach each neighbor through a process called neighbor discovery. Once neighbors are found and located through the neighbor discovery process, neighbor mesh network devices are chosen via a neighbor selection process. The initial selection may be done locally. In one embodiment, an optimized selection using the MNCS as described herein that can take a full network perspective of the WMN to globally select neighbors for any one of the mesh network devices in the WMN. Once neighbors are selected by the neighbor selection process, the mesh network device can store the radio configuration for routing data traffic to neighboring mesh network devices. In one embodiment, after neighbor mesh network devices are selected, a Mesh Unification Layer (MUL) is informed of the new radio configuration, and the MUL can begin mesh peering and authentication. The MUL may be a software interface layer between the IP layer and MAC layer of the OSI software layers. The MUL can abstract the underlying hardware to high level software and can operate a bridge between a data stack of an operating system and the underlying radios. This bridge can be used to route data between the data stack and one of the radios and route data from one radio to another radio.

Figure 5A:
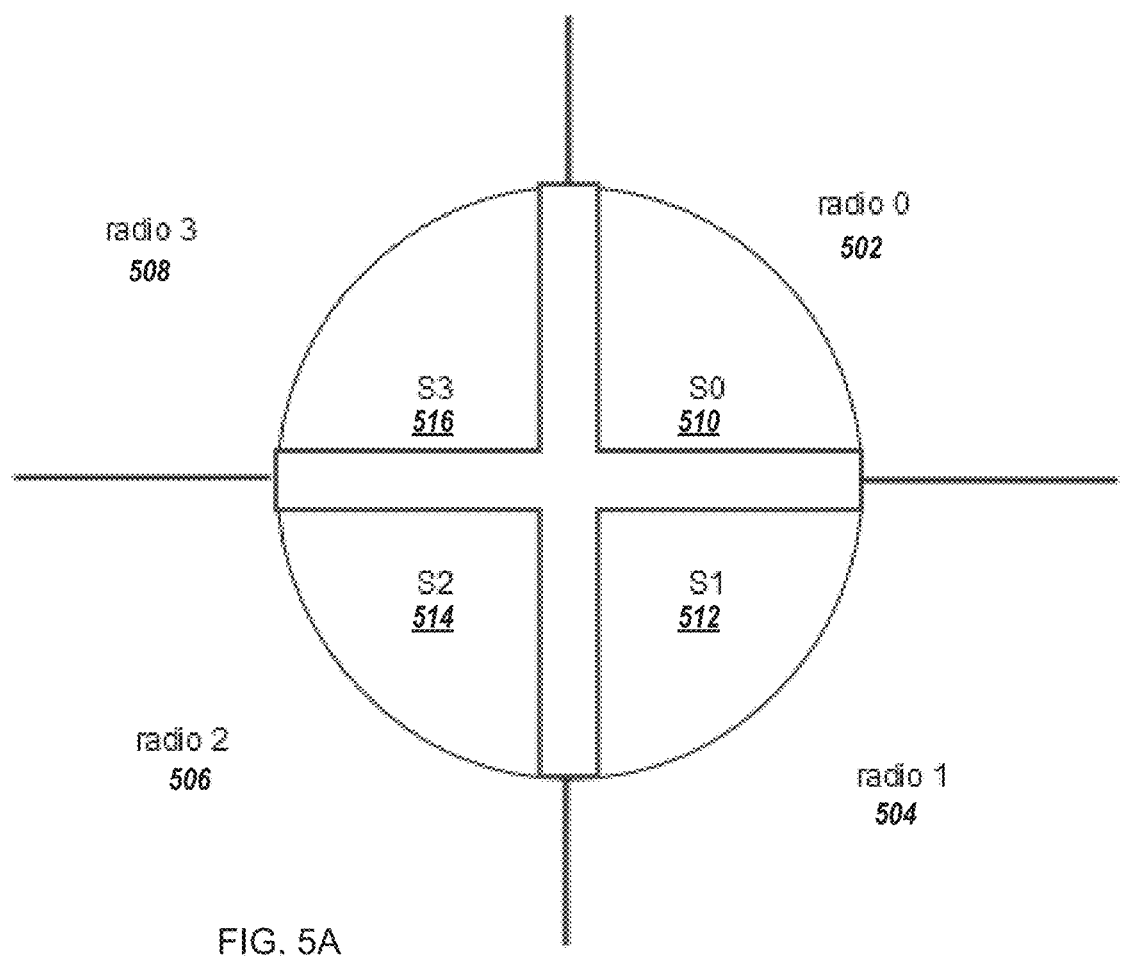
FIG. 5A is a diagram illustrating four radios configured to communicate via four sectors according to one embodiment.

For description of the neighbor discovery process, four 5 GHz radios are used with directional antennas as shown in FIG. 5A. For this example, multiple neighbors are allowed per radio and each of four 5 GHz radios with directional antennas can connect to one antenna at a time. Alternatively, in other embodiments, a single neighbor may be allowed per radio. It should be noted that the four radios, as described herein, may be referred to as directional radios or 5 GHZ directional radios, since these antennas are each coupled to a directional antenna in one of the sectors.

Figure 5B:
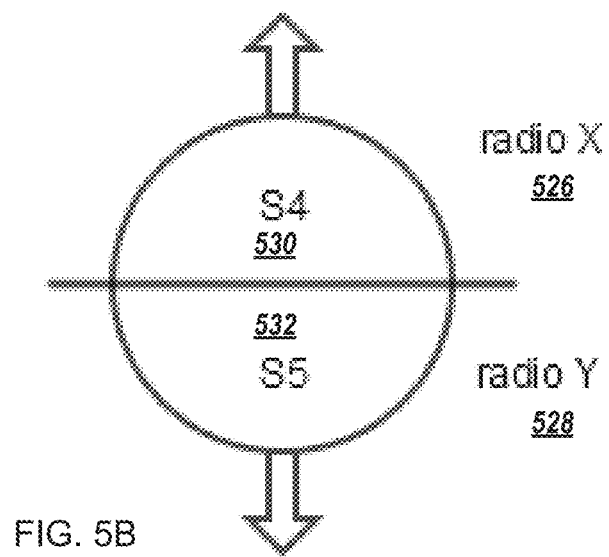
FIG. 5B is a diagram illustrating any two radios configured to communicate via fifth and sixth sectors according to one embodiment.

FIG. 5A is a diagram illustrating four radios 502-508 configured to communicate via eight sectors 510-516 of a mesh network device according to one embodiment. In this embodiment, the four radios 502-508 are directional radios. Each of the four 5 GHz radios with directional antennas (e.g., four antennas) can connect to one antenna at a time (e.g., to a separate one of four directional antennas). Each radio has its own horizontal quadrant, with one sector in each quadrant. In another embodiment, multiple sectors (e.g., with multiple antennas) may be in each quadrant. Each of the directional radios can be assigned to (i.e., configured to communication via) one or more antennas in one of the four sectors. For example, a first radio 502 is coupled to a first antenna in a first sector 510. A second radio 504 can be coupled to a second antenna in the second sector 512. A third radio 506 can be coupled to a third antenna in the third sector 514. A fourth radio 508 can be coupled to an antenna in sector 516. In one embodiment, only one neighbor mesh network device is allowed per radio. So, in this example, there will be four neighbors assigned to each of the radios 502-508. In another embodiment, multiple neighbors may be assigned to each of the radios 502-508. In one embodiment, the four radios 502-508 are four 5 GHz radios as described herein. The mesh network device can have additional antennas, like another 2.4 GHz radio coupled to an omnidirectional antenna. The mesh network device can have two additional antennas (e.g., two additional directional antennas). As illustrated in FIG. 5B, any one of the radios 502-508

(labeled as radio X 526) can connect to an antenna in an up sector 530 (also referred to as a fifth sector). Another one of the radios 502-508 (labeled as radio Y 528) can connect to an antenna in a down sector 532 (also referred to as a sixth sector). Similarly, each of the sectors 530, 532 can include multiple antennas as described herein. The radio X 526 can connect to the antenna in the up sector 530 at the same time as the radio Y 528 connects to the antenna in the down sector 532. In this embodiment, the four sectors 510-516 are horizontal sectors because these sectors are physical located on the sides of the mesh network device and the up sector 530 and down sector 532 are vertical sectors because these sectors are physically located on the top and bottom of the mesh network device. In some cases, the horizontal sectors are used to communicate content data to other mesh network devices that are disposed roughly in the same horizontal plane, wherein the vertical sectors can be used to communicate content data to other mesh network devices that are disposed on different horizontal planes, such as on different levels of a building.

In one embodiment, each 5 GHz radio can connect to any 5 GHz channel. If more than one radio is tuned to the same channel, neither radio should transmit any packets on that channel. However, both radios can be listening on the same channel with no problems. Because communication between 5 GHz directional radios may be symmetric, receive signal strength indicator (RSSI) can be measured in one direction from the source radio to the destination radio. Alternatively, other metrics can be measured for the neighbor discovery and neighbor selection processes.

In one embodiment, all six radios are assigned media access control (MAC) addresses. The MAC addresses for all six radios are configured such that each individual radio's MAC address can be derived from a base Node MAC address assigned to the mesh network device. In one embodiment, the MAC addresses are 48 bits and the first 45 bits are common to all MAC addresses for the mesh network device, and the last 3 bits are reserved for individual radios. Table 1 below provides an example of the assignments to radios using the last 3 bits.

TABLE 1

| | |
|---|---|
| 000 | Node MAC |
| 001 | Directional radio 1 |
| 010 | Directional radio 2 |
| 011 | Directional radio 3 |
| 100 | Directional radio 4 |
| 101 | Omnidirectional 2.4 GHz radio |
| 110 | Omnidirectional 5 GHz radio |
| 111 | Reserved |

In one embodiment, the mesh network device of FIG. 5 includes a first radio (not illustrated in FIGS. 5A-5B) coupled to an omnidirectional antenna and four radios 502-508, each individually coupled to a directional antenna in one of the six sectors 510-516 and 530-532. The four radios 502-508 are organized into four sectors, each of the four sectors comprising a directional antenna. Each of the four radios includes four channels. The application processor of the mesh network device is coupled to the first radio and the four radios. During neighbor discovery, the application processor instructs the first radios to listen for beacon frames sent by other mesh network devices on all channels of the first radio. In one embodiment, the application processor is configured to: i) receive, via the first radio, a 2.4 GHz beacon frame from a second mesh network device, the 2.4 GHz beacon frame including a first informational element identifying the second mesh network device as an available access point in a wireless mesh network (WMN); ii) listen, for a defined time period, on a first channel of the second radio, a first channel of the third radio, a first channel of the fourth radio, and a first channel of the fifth radio; iii) repeat step ii) on a second channel, a third channel, and a fourth channel for each of the second radio, the third radio, the fourth radio, and the fifth radio; iv) in response to steps ii) and iii), receive, via the second radio, a 5 GHz mesh frame from the second mesh network device, the 5 GHz mesh frame including an identifier (ID) of the second mesh network device; v) compare the first informational element to the ID to determine a sector identifier that identifies a first sector from which the 5 GHz mesh frame is transmitted, a first signal strength indicator (RSSI) value corresponding to the 5 GHz mesh frame, an unused radio and an unused channel of the second mesh network device, wherein the unused radio and the unused channel are not currently utilized by the second mesh network device; vi) send a discovery request frame to the unused radio of the second mesh network device on the unused channel via each of the second radio, the third radio, the fourth radio, and the fifth radio, wherein during ii) and vi), the second radio is selectively coupled to the first one of the plurality of directional antennas, the third radio is selectively coupled to the second one of the plurality of directional antennas, the fourth radio is selectively coupled to the third one of the plurality of directional antennas, and the fifth radio is selectively coupled to the fourth one of the plurality of directional antennas; vii) receive a locate probe from the second mesh network device on the unused channel, in response to the discovery request frame, via at least one of the first radio, the second radio, the third radio, or the fourth radio, the locate probe including a source sector identifier that identifies a second sector from which the locate probe is transmitted; and viii) determine a second signal strength indicator value corresponding to the locate probe.

Neighbor discovery may be done every time a mesh network device boots up. In other cases, the mesh network device can do a periodic neighbor discovery to verify the network, like every day or at other scheduled times. In some embodiments, a neighbor table can be stored in persistent memory and the mesh network can verify its validity on boot. If the table is still valid, the neighbor discovery process can be skipped or portions of the neighbor discovery process can be skipped. It should be noted that, in one embodiment, protocol control communication can be made with the 2.4 GHz radio (coupled to an omnidirectional antenna), except for the broadcasts made for the location probe transmissions done by the 5 GHz directional radios during the respective processes as described herein.

Figure 6A:
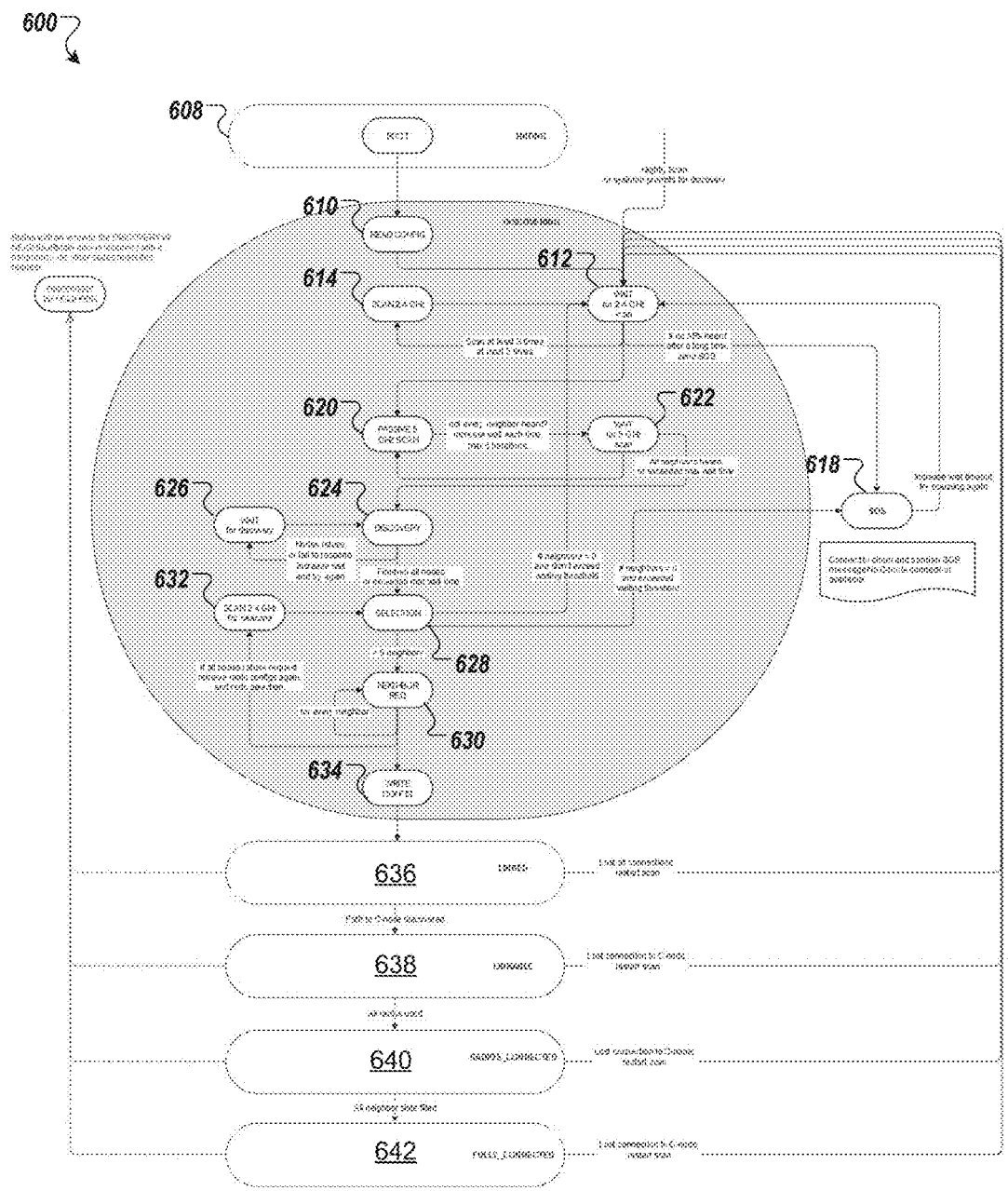
FIG. 6A is a flow diagram of a method of a neighbor discovery process by a mesh network device according to one embodiment.
Figure 7:
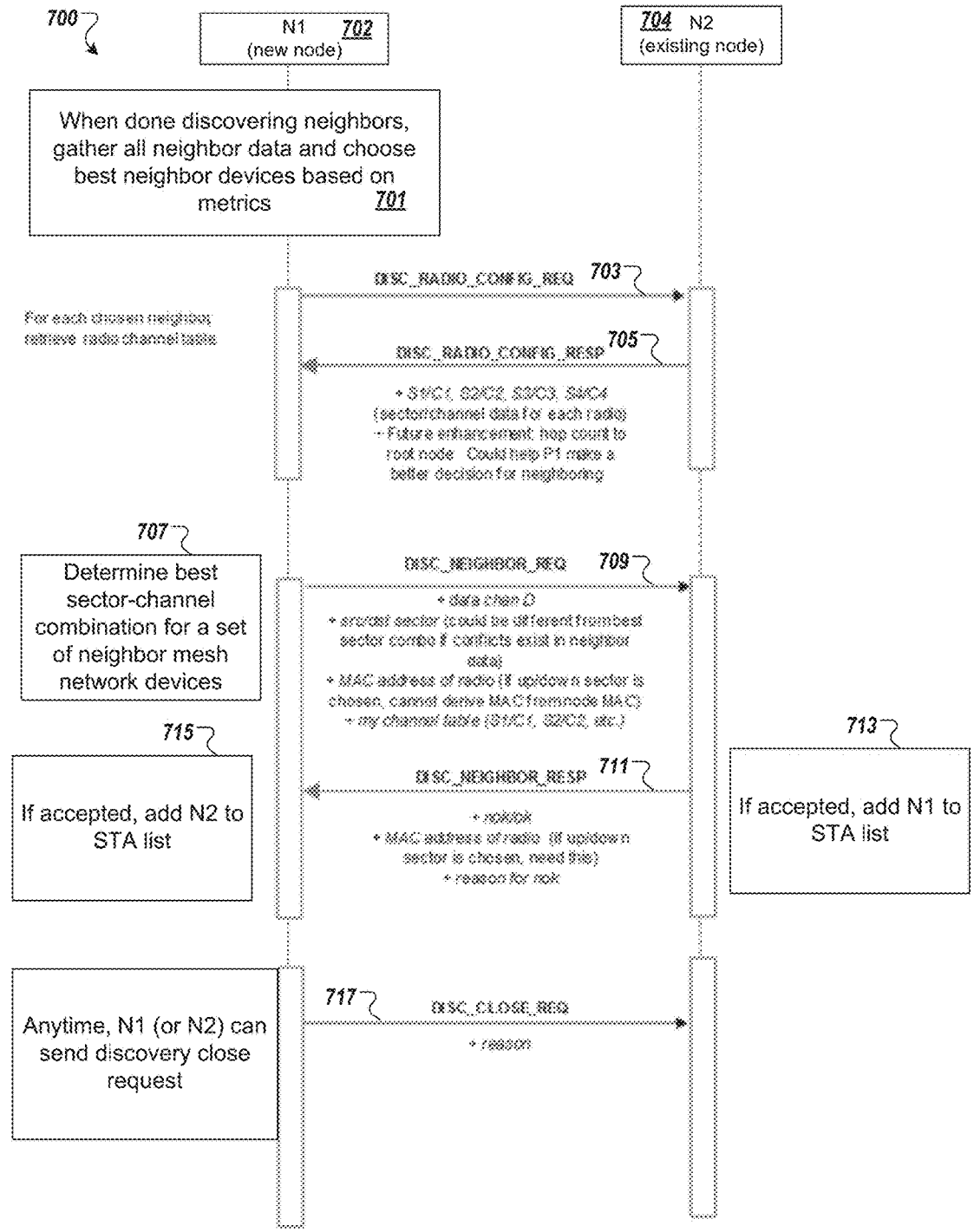
FIG. 7 is a flow diagram of a method of a neighbor selection process by a mesh network device according to one embodiment.

FIG. 6A is a flow diagram of a method 600 of a neighbor discovery process by a mesh network device according to one embodiment. The method 600 may be performed by processing logic that includes hardware (e.g., circuitry, dedicated logic, programmable logic, microcode, etc.), software (e.g., instructions executed by a processing device), firmware or a combination thereof. In one embodiment, The method 600 is performed by the mesh network devices 102-106 of FIG. 1. In another embodiment, the method 600 is performed by the mesh network devices 202-210 of FIG. 2. In another embodiment, the mesh node 300 of FIG. 3 performs the method 600. In another embodiment, the SoC 402 of FIG. 4 performs the method 600. Alternatively, an application processor of the mesh network device performs the method 600.

Referring to FIG. 6A, the method 600 begins with the processing logic of a mesh network device booting up (e.g., initializing) 608. At block 610, processing logic may read a configuration file (e.g., a persistent neighbor configuration file). In one embodiment, the configuration file contains information for configuring and/or reconfiguring the radios of the mesh network device after boot, such as: previously connected neighbors, radio sectors, and channel information, for reconfiguring the radios. In one embodiment, a binary configuration file contains collected neighbor information, including RSSI tables and neighbor radio configuration. In one embodiment, if the current mesh network device is a D-pop, processing logic may skip directly to linkable state (e.g., a linkable node state). On reboot, processing logic may add previously connected neighbors to a multi-radio mesh (mrmesh) module, in anticipation that they will boot soon, or that they are already up and waiting for the D-pop to return. Processing logic may wait 612 a random (e.g., nondeterministic) amount of time to start scanning.

At 614, processing logic scans 2.4 GHz channels, looking for AP beacons with specific vendor identifiers. In one embodiment, AP beacons include sector, channel, and neighbor count data associated with individual radios. Processing logic may store found nearby nodes (identified by AP beacons) in a neighbor list and notes their current node state. In one embodiment, processing logic repeats wait 612 and scan 614 at least three times, to make sure that no nearby nodes are missed. After the third time, if no new nodes are heard, processing logic may stop the scan and increase the wait time 612. In one embodiment, the scan is performed a threshold (e.g., five) number of times before continuing to the passive scan 620. In one embodiment, after a defined number of minutes of scanning and without hearing a nodes, processing logic may send an SOS message to the cloud.

In one embodiment, after a reboot, the node may already have a list of nearby nodes (e.g., a list of neighbor mesh network devices), including connected nodes and unselected nodes. Processing logic may attempt to find all previously connected and unselected nodes. If not all of its previously connected neighbor nodes are seen, the node may continue on after a defined number of minutes of scanning. Processing logic may assume that if the previously-connected neighbor is also rebooting (and will eventually come back up), it will reconnect to the node. Processing logic may add the node as a neighbor to mrmesh, so that the nodes will automatically peer when the neighbor does boot up. In one embodiment, if there is only one connected neighbor for current node, or if none of the previously connected neighbors are seen, then: If there are other nearby nodes, and the current node can only connect to the other nearby nodes by disconnecting from the previously connected neighbor(s) (which is down), processing logic may remove the neighbor(s) and attempt to connect to the other nodes. If there are no other nearby nodes, and the neighbor node(s) isn't seen after a defined number of minutes of scanning, processing logic may send an SOS message to the cloud.

At 620, processing logic may complete a passive scan (e.g., over 5 GHz) to look for mesh frames. As described above, a mesh frame may be a unicast data frame sent by one node to another. Mesh frames may contain network data transmitted through the mesh network via neighboring nodes. During the passive 5 GHz scan, processing logic may iterate through its nearby neighbor list, and build a list of used channels for its linkable neighbors. For each radio, the processing logic of the node may scan all the used 5 GHz channels sequentially looking for mesh frames. Processing logic may match the MAC address (and thus a particular radio) to one of the neighbors in its list, retrieve the sector being used for that radio, and store the beacon's RSSI into the corresponding slot in the neighbor's RSSI table. In one embodiment, processing logic waits a random wait time between scans 622. In one embodiment, processing logic may increase the wait time with each subsequent scan. Additional description of passive scan 620 is described with respect to FIG. 6B. In one embodiment, if the timing of scans, interference from other signals, and/or sparse beacon intervals prevent the node from hearing all nearby nodes, the node may stop listening and move on to the next stage (e.g., discovery 624) after a defined time period.

At 624, processing logic performs discovery (also referred to herein as active discovery). During discovery, processing logic iterates through the nearby neighbor list. If a node in the list is linkable, and it has at least one unused radio, processing logic of the node sends a discovery request frame to request to start the discovery processes with the linkable node. In one embodiment, the discovery request frame contains the request to start the discovery process with the neighbor. If the node already has probe data in its RSSI table for this neighbor, processing logic may skip this neighbor (unless the data is deemed outdated). The neighbor determines which radios are unused (either all radios or a subset), and sends a locate probe (e.g., a response frame) from those sectors. Additional details of discovery 624 are provided with respect to FIG. 6C.

If a neighbor declines discovery, processing logic may proceed to the next neighbor in the list. If the remaining list only contains neighbors that have declined discovery, processing logic may add a random wait time, and try again after the wait time expires 626. After a defined number of minutes of attempting to perform discovery have passed, and no more neighbors have accepted discovery, processing logic may end the discovery process. If no neighbors have accepted discovery, and no data was gathered from passive scan 620, processing logic may increase the wait time and continue to attempt to send discovery request frames. If no neighbors have accepted discovery, but data was gathered from passive scan 620, processing logic may continue to the next phase (e.g., selection 628).

At 628, processing logic performs neighbor selection. During neighbor selection, processing logic chooses nodes from the set of linkable neighbors in its list. If no neighbors are selected, processing logic may wait for a defined time threshold, and repeat from 612. If a defined amount of time has been exceeded, and still no neighbors found, processing logic may send an SOS message to the cloud 618. In one embodiment, if all of a node's nearby neighbors already have the maximum number neighbors, such that the node may not establish any new connections, the processing logic of the node may make an exception during selection, and choose neighbors that are fully connected. The node may then send a discover neighbor request to those nodes with an "urgent" flag. This may cause the neighbor to replace one of its existing neighbors with the isolated node.

At 630, processing logic asks each of its neighbors to pair with it. If the nodes were previously connected, processing logic may skip this step. In one embodiment, if enough nearby nodes reject a discovery neighbor request, the node may refresh its list of neighbor radio configurations (either re-scan the 2.4 GHz beacons 632, or send discovery radio configuration requests), and re-start neighbor selection. At 634, processing logic may store information back to the persistent neighbor configuration files. 636-642 show the transition from states in the neighbor discovery process. At 636, the node in the linked state may transition to the linkable state 638 when a C-node is discovered. The node may transition to the linked state 636 when neighbors are successfully peered. The node may transition to the linkable state 638 when the path to the C-node is discovered. The node may transition to the radios connected state 640 when linkable and all radios are in use. The node may transition to the fully connected state 642 when all radios have the maximum number of neighbors.

Figure 6B:
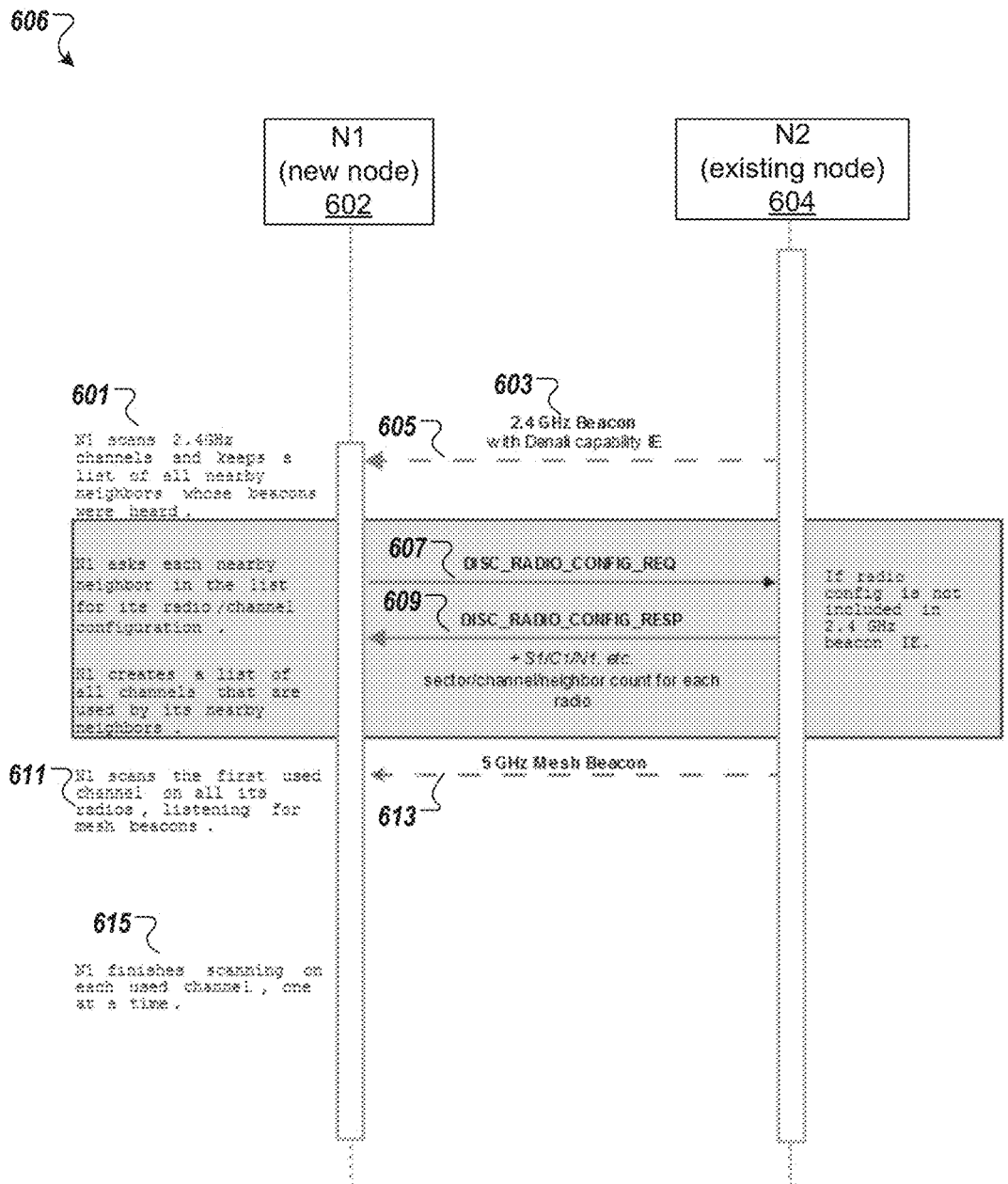
FIG. 6B is a flow diagram of a method of a passive neighbor discovery process by a mesh network device according to one embodiment.

FIG. 6B is a flow diagram of a method 606 of a passive neighbor discovery process by a mesh network device according to one embodiment. The method 606 may be performed by processing logic that includes hardware (e.g., circuitry, dedicated logic, programmable logic, microcode, etc.), software (e.g., instructions executed by a processing device), firmware or a combination thereof. In one embodiment, The method 606 is performed by the mesh network devices 102-106 of FIG. 1. In another embodiment, the method 606 is performed by the mesh network devices 202-210 of FIG. 2. In another embodiment, the mesh node 300 of FIG. 3 performs the method 606. In another embodiment, the SoC 402 of FIG. 4 performs the method 606. Alternatively, an application processor of the mesh network device performs the method 606.

Referring to FIG. 6B, the method 606 begins with the processing logic of a mesh network device 602 (labeled N1) instructs a first radio coupled to an omnidirectional antenna to listen on all channels for access point (AP) beacon frames sent by other mesh network devices (601). It should be noted that the first radio, as described herein, may be referred to as omnidirectional radio or 2.4 GHZ omnidirectional radio, since the first radio is typically coupled to an omnidirectional antenna. Also, listening for AP beacon frames can also be considered a scan. The processing logic of the mesh network device 602 can verify that the AP beacon frame is sent by a mesh network device in the WMN and that its RSSI value meets a minimum threshold. Processing logic of a second mesh network device 604 (labeled P2) sends AP beacon frames over a 2.4 GHz omnidirectional radio on a channel (603). The AP beacon frames can be sent on the same channel as other regular clients use that are not considered mesh network devices.

Processing logic of the mesh network device 602 receives an AP beacon frame 605 with an information element (IE) that identifies the device as being a mesh network device having mesh network capability. At 607, the processing logic may verify that this is an AP mesh network device and that an RSSI value meets a minimum threshold. After the scan is complete, the processing logic creates a list of potential neighbor devices. The processing logic chooses one of the mesh network devices from the list and starts a discover process with it. It should be noted that, at 601, if no AP beacon frames are heard after a timeout, the mesh network device may be the only mesh network in the network and it can start sending out its own AP beacon frames.

The processing logic of the mesh network device 602 sends a radio configuration request 607 to each of the possible neighbor devices in the list via the omnidirectional radio. In one embodiment, the request is sent via 2.4 GHz unicast. The processing logic of the mesh network device 602 receives a radio configuration response 609 from each of the possible neighbor devices in the list via the omnidirectional radio. Each of the radio configuration responses 609 may include a radio configuration table with sector data and channel data for each radio of the respective one of the possible neighbor devices in the list. The radio configuration responses 609 could also include a hop count to a root node. This may help the mesh network device 602 make a better decision for selecting neighbors. In the depicted embodiment, the radio configuration request 607 is sent to a second mesh network device 604 and the radio configuration response 609 is received from the second mesh network device 604.

At 611, processing logic of mesh network device 602 scans the first used channel on all radios, listening for mesh frames. A 5 GHz mesh frame is sent from second mesh network device 604 and received by mesh network device 602. In one embodiment, when mesh network device 602 receives a beacon (e.g., mesh frame 613), processing logic of mesh network device 602 uses the MAC address of the sender (e.g., second mesh network device 604) to find the corresponding neighbor in the list of neighbors (e.g., compiled from the 2.4 GHz scan). Processing logic may determine which sector the neighbor is transmitting on (based on the radio configuration response), and store the RSSI of the beacon to the corresponding table. At 615, processing logic finishes sequentially scanning on each used channel.

In one embodiment, after the passive neighbor discovery process 606 has been done for the second mesh network device 604, the mesh network device 602 may start discovery with another mesh network device. When discovery is done for all neighbors on the list, the processing logic of the mesh network device 602 can perform an active neighbor discovery, as described with respect to FIG. 6C.

Figure 6C:
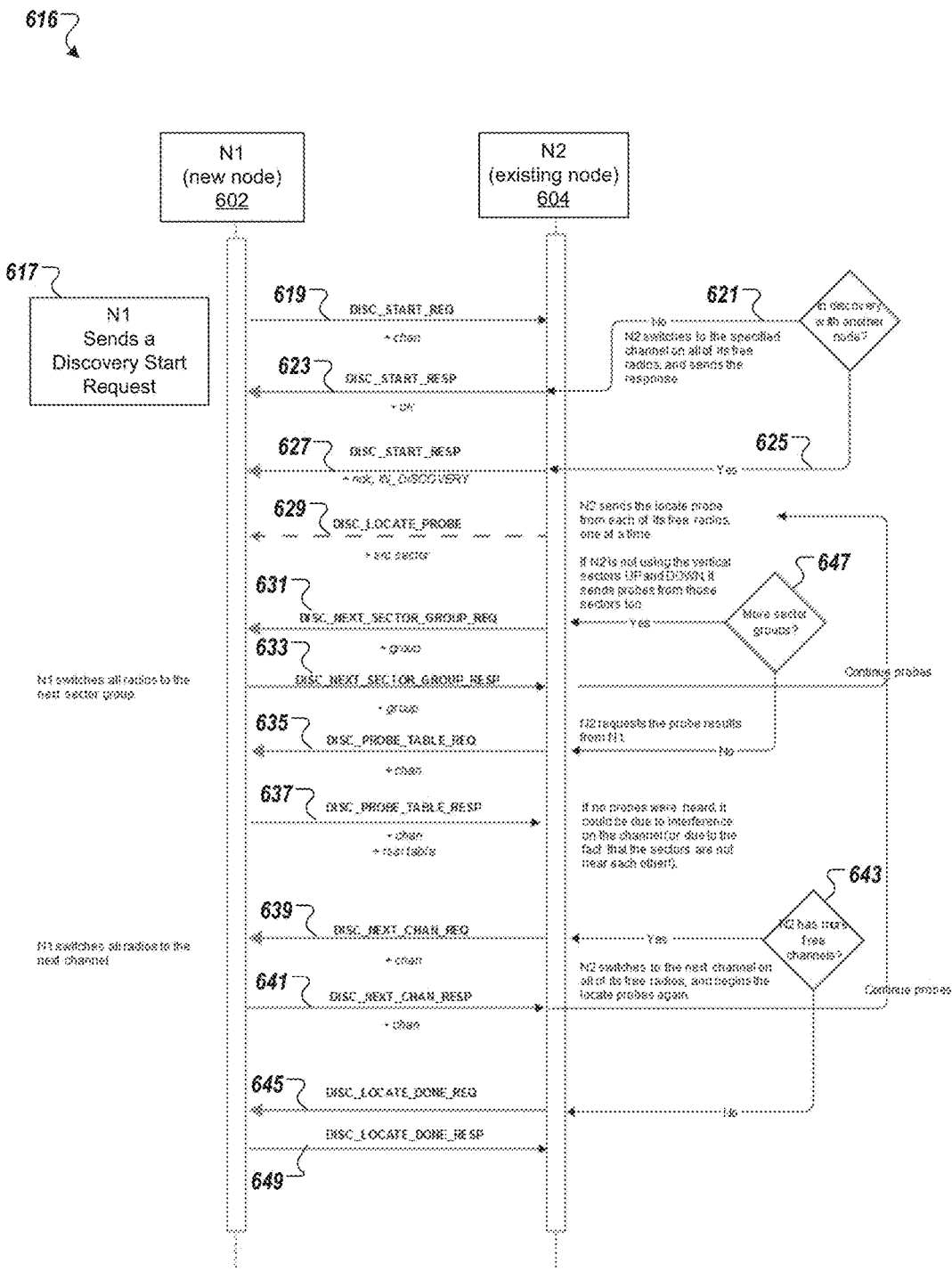
FIG. 6C is a flow diagram of a method of an active neighbor discovery process by a mesh network device according to one embodiment.

FIG. 6C is a flow diagram of a method 616 of an active neighbor discovery process by a mesh network device according to one embodiment. The method 616 may be performed by processing logic that includes hardware (e.g., circuitry, dedicated logic, programmable logic, microcode, etc.), software (e.g., instructions executed by a processing device), firmware or a combination thereof. In one embodiment, The method 616 is performed by the mesh network devices 102-106 of FIG. 1. In another embodiment, the method 616 is performed by the mesh network devices 202-210 of FIG. 2. In another embodiment, the mesh node 300 of FIG. 3 performs the method 616. In another embodiment, the SoC 402 of FIG. 4 performs the method 616. Alternatively, an application processor of the mesh network device performs the method 616.

Referring to FIG. 6C, processing logic of mesh network device 602 identifies and selects a channel that second mesh network device 604 is not currently using, switching all radios of mesh network device 602 to the unused channel, and sends a discovery start request 619 to second mesh network device 604 via the unused channel (617). The processing logic of the mesh network device 602 sends a start request 619 to the second mesh network device 604 via the omnidirectional radio. The start request 619 includes a node identifier of the mesh network device and a data channel identifier. In one embodiment, the second mesh network device 604 verifies that the mesh network properties match and that the RSSI value meets a minimum threshold. The second mesh network device 604 determines if it is in a discovery with another mesh network device. If it is 625, the processing logic of the second mesh network device 604 sends a discovery start response 627 with a negative acknowledgement (nok) and a reason, i.e., that the second mesh network device 604 is in discovery with another mesh network device. In one embodiment, the negative acknowledgement can be triggered by multiple states, such as: (1) IN_DISCOVERY state—the node is already in discovery with another node; (2) AP_BUSY state—the node is too busy for discovery, i.e., it is actively streaming content from one or more radios; or (3) INVALID_IE_CAP state—mesh network device IE capabilities do not match. The mesh network device 602 can set a timer and try again if the reason indicates that the second mesh network device 604 is too busy. In another embodiment, the mesh network device 602 can start discovery with another one of the possible neighbor nodes on the list.

If no at 621, the processing logic of the second mesh network device 604 sends a discovery start response 623 with a positive acknowledgement (ok) and a node identifier, such as node MAC address of the second mesh network device 604.

The processing logic of the second mesh network device 604 broadcasts, for each unused radio, a first frame 629 (labeled discovery locate probe 629) multiple times from each unused radio without waiting for acknowledgements or responses. As described herein, the broadcasts are done on unused radios that are each coupled to a directional antenna. It should be noted that the unused radios, as described herein, may be referred to as directional radios or 5 GHZ directional radios, since these antennas are each coupled to a directional antenna in one of the sectors. The processing logic of the second mesh network device 604 sends the discovery locate probe 629 on a first unused channel (e.g., of an unused radio) via a directional antenna at the corresponding first sector. The first frame 629 may include a source sector identifier that identifies from which respective sector the respective first frame is transmitted. The delay may be periodic or random. The delay can be used to avoid interference issues, e.g., if another nearby node pair is also doing discovery at the same time.

In one embodiment, the first mesh network device 602 can listen on all radios on corresponding sectors, such as all alternating sectors. For instance, the second mesh network device 604 can listen on all even-numbered sectors, then all odd-numbered sectors, then up and down sectors. The first mesh network device 602 stores RSSI values for every sector that receives the broadcast. In one embodiment, the first mesh network device 602 may only store the best RSSI value for that sector. In this embodiment where the first directional radio is coupled to the first sector, the processing logic of the second mesh network device 604 sends the discovery locate probe 629 on the first unused channel via a directional antenna at the corresponding sector. The first frame 629 includes a source sector identifier that identifies the second sector from which the respective first frame is transmitted.

In one embodiment, the second mesh network device 604 sends this frame from every unused radio without waiting for an acknowledgement or response. After sending the first discovery locate probe 629 for all sectors, the processing logic of the second mesh network device 604 sends a next channel request 639 via the omnidirectional radio. The first mesh network device 602 listens on all directional radios on the first unused channel for the next sector group and sends a next channel response 641. The next channel response 641 may include an indicator that there are more sectors to try, e.g., true flag indicates that there are more sectors set to test.

At 647, the processing logic of the second mesh network device 604 can determine if there are more sectors to try. If yes, the processing logic starts sending the discovery locate probe 629 again with another sector, 631. If no, the processing logic sends a discovery probe table request 635 to mesh network device 602. In response to the discovery probe table request 635, mesh network device 602 may send a discovery probe table response, including probe results, to second mesh network device 604. At 643, processing logic determine if there are more unused channels to try. If processing logic determines that there are more channels on the radio to try, the processing logic sends a next channel request 639 via the omnidirectional radio to mesh network device 602. The mesh network device 602 prepares the directional radios for transmission on the first sector and using a next channel (chan C+1). The first mesh network device 602 listens on all directional radios on the next channel for the first sector and sends a discovery next channel response 641.

When the processing logic of the second mesh network device 604 determines that there are no more channels to try at 643, the processing logic of second mesh network device 604 sends a discovery locate done request 645 via the omnidirectional radio. The processing logic of the first mesh network device 602 sends back a discovery locate done response 649 with all RSSI values from every sector combination, and from each of the channels. It should be noted that the requests and response as described herein may be action frames where a flag is set to perform a particular action at the respective device. The action frame may also include corresponding data to perform the action by the respective device.

After neighbor discovery process has been done for the second mesh network device 604, the mesh network device 602 can start discovery with another mesh network device by sending a discovery start request with another mesh network device from the list. When discovery is done for all neighbors on the list, the processing logic of the mesh network device 602 can gather all neighbor data and choose best neighbors based on the RSSI values. It should be noted that other metrics may also be collected, such as packet error rate, Signal-to-Interference-plus-Noise Ratio (SINR), Packet-Delivery Ratio (PDR), Bit-error rate (BER), or round-trip time (RTT). The processing logic of the mesh network device 602 can perform a neighbor selection process to select neighbor mesh network device for each of the radios, as described with respect to FIG. 7.

FIG. 7 is a flow diagram of a method 700 of a neighbor selection process by a mesh network device 702 according to one embodiment. The method 700 may be performed by processing logic that includes hardware (e.g., circuitry, dedicated logic, programmable logic, microcode, etc.), software (e.g., instructions executed by a processing device), firmware or a combination thereof. In one embodiment, the method 700 is performed by the mesh network devices 102-106 of FIG. 1. In another embodiment, the method 700 is performed by the mesh network devices 202-208 of FIG. 2. In another embodiment, the mesh node 300 of FIG. 3 performs the method 700. In another embodiment, the SoC 402 of FIG. 4 performs the method 700. Alternatively, an application processor of the mesh network device performs the method 700.

Referring to FIG. 7, the method 700 begins with the processing logic of a mesh network device 702 (labeled N1) gathering all neighbor data and choosing best neighbor mesh network devices based on the metric, such as RSSI (701). The processing logic of the mesh network device 702 sends a radio configuration request 703 to each of the possible neighbor devices in the list via the omnidirectional radio. The processing logic of the mesh network device 702 receives a radio configuration response 705 from each of the possible neighbor devices in the list via the omnidirectional radio. Each of the radio configuration responses 705 may include a radio configuration table with sector data and channel data for each radio of the respective one of the possible neighbor devices in the list. The radio configuration responses 705 could also include a hop count to a root node. This may help the mesh network device 702 make a better decision for selecting neighbors. In the depicted embodiment, the radio configuration request 703 is sent to a second mesh network device 704 and the radio configuration response 705 is received from the second mesh network device 704.

From all the radio configuration tables, the processing logic of the mesh network device 702 determines a best sector-channel combination for a set of the neighbor mesh network devices (block 707) described in more detail below. In one embodiment, the processing logic of the mesh network device 702 selects a source sector, a destination sector, and a channel for at most four of the possible neighbor devices in the list using the radio configuration tables. The processing logic of the mesh network device 702 sends a neighbor pairing request 709 to some number of the possible neighbor devices via the omnidirectional radio. Each of the neighbor pairing requests 709 may include a source sector identifier, a destination sector identifier, a channel identifier, a MAC address of the corresponding one of the four directional radios, and a radio configuration table for the mesh network device 702. The neighbor pairing request 709 may indicate that the mesh network device 702 is requesting to be paired with a particular neighbor device or devices. The processing logic of the second mesh network device 704 sends a neighbor pairing response 711 with a positive acknowledgement (e.g., an indication that the pairing request was accepted) and a MAC address of one of its four directional radios via the omnidirectional radio. If the pairing is accepted, the processing logic of the second mesh network device 704 adds the mesh network device 702) to its directional radio's station (STA) list so that it can receive data packets from the mesh network device 702 (block 715). The neighbor pairing response 711 could also include a negative acknowledgment, declining the pairing, and a reason for the rejection. The negative acknowledgement can be triggered by different states, such as (1) MAX_NEIGHBORS state—the node already has its maximum number of neighbors and is unwilling to discard a neighbor; (2) BAD_CHAN state—the node is already using the requested data channel. The first state (1) and the second state (2) may occur when the second mesh network device 704 added a neighbor between the time that radio configuration response 705 is sent and the neighbor pairing request 709 is received by the second mesh network device 704. For the second state (2), the second mesh network device 704 can send another radio configuration request to the second mesh network device 704. It should be noted that in the embodiments described above, there is an assumption of one radio per neighbor. In other embodiments where one radio can be assigned more than one neighbor, the processing logic can send more than four neighbor pairing requests as described above.

In another embodiment, at any point during the neighbor discovery process (e.g., method 616 of FIG. 6C or the neighbor selection process (e.g., method 700 of FIG. 7), the mesh network device 702 can send a discovery close request 717 to stop discovery. For instance, if no response is heard from another node within a timeout, the discovery process could be stopped.

In one embodiment, the processing logic of the mesh network device (N1) 802 can select neighbors to determine the best configuration for its own radio channel table after N1 has received radio configurations (DISC_RADIO_CONFIG_RESPs) from its neighbors. In this embodiment, RSSI is the metric used to choose the neighbors. Each chosen neighbor must meet a minimum RSSI threshold over the 5 GHz connection. The minimum RSSI threshold can be used to ensure that throughput over the mesh network is at an acceptable level. In other embodiment, other metrics may be used. The priority may be to connect all four radios to neighbors and only one neighbor is connected per radio. In this example, one radio can connect to the UP sector, and another radio can connect to the DOWN sector.

In a further embodiment, the following algorithm can be used to select neighbors at block 707:

1. Build a master neighbor table. This table contains all viable neighbors, and all of their viable sector combinations and RSSIs. If there are banned sectors for N1's radio, they are not included in the list of viable sectors. Add a neighbor n to this table only if:
    a. n was successfully probed during discovery, with a minimum RSSI;
    b. n has at least one radio free; and
    c. at least one of n's directional radios (on which our probes were heard) is available to be paired
2. If the master neighbor table has only one entry, choose the sector combination with the best RSSI, and the algorithm is done.
3. Decide which radio to connect.
    a. Find the radio that has the fewest number of neighbors (1 or more) that can connect directly to it (fixed sectors 0-7 only, not UP/DOWN sectors).
        i. If there's a tie between radios, and the number of neighbors is 1, check if the neighbor is the same for all the tied radios.
        ii. If so, choose the radio/neighbor with the highest RSSI.
        iii. Otherwise, if there's a tie between radios, choose the radio from the shortlisted group that has the fewest free channels.
        iv. If there's a tie in step iii, choose the first unpaired radio from the shortlisted group that has available neighbors.
    b. If no radio is found in step a., find the radio with the fewest free channels.
        i. If there's a tie in step b., randomly choose the first radio from the shortlisted group.
    c. If no radio is found in step b., choose the first radio that hasn't been paired yet.
4. Decide which neighbor to pair with on this radio.
    a. If the master neighbor table has only one entry, choose the sector combination with the best RSSI, and the algorithm is done.
    b. Find the neighbor with the fewest fixed radios (via sectors 0-7, not UP/DOWN sectors) it can connect to (1 or more), including this radio.
        i. If there's a tie between neighbors, choose the neighbor from the shortlisted group with the fewest free channels.
        ii. If there's a tie between neighbors in step i., choose the neighbor from the shortlisted group with the best RSSI.
    c. If no neighbor is found in step b., then all remaining neighbors can connect only via UP or DOWN sectors. Choose the neighbor with the best RSSI on the UP sector, and the neighbor with the best RSSI for the DOWN sector.
5. Repeat steps 3 and 4 until all radios that can be paired are paired.

Alternatively, other algorithms may be used to select neighbors at block 707.

In another embodiment, if the configuration of the mesh network device allows more than one neighbor per radio, N1 could choose to use to use the same channel that N2 is already using with its current neighbor. N2 does not need to change any of its configurations and it would just need to know that it has more than one neighbor for that radio.

The following below is an example the mesh network device N1 finds three nearby nodes (N1, N2, N3), and decides which ones it can pair with. The following radio configuration table includes neighbor radio configuration and a list of successfully probed sectors as shown in Table 2 below:

TABLE 2

| Neighbor | Radio configuration | Probed Sectors | Key |
|---|---|---|---|
| N1 | R0: disconnected<br>R1: S2, C1<br>R2: s9, C0<br>R3: S7, C3 | (S1, S0) → −69<br>(S1, S2) → −57 | Radio Configuration:<br>Rx radio (0-3)<br>Sx: sector (0-9)<br>Cx channel (0-3) |
| N2 | R0: S1, C0<br>R1: disconnected<br>R2: disconnected<br>R3: disconnected | (S9, S9) → −70<br>(S9, S0) → −76 | Sectors:<br>(Sx, Sy) → RSSI<br>The first sector number is the source sector and the second number is the neighbors sector (destination sector) |
| N3 | R0: disconnected<br>R1: S3, C3<br>R2: disconnected<br>R3: S6, C0 | (S0, S9) → −41<br>(S1, S9) → −50<br>(S8, S4) → −61 | Radio Configuration:<br>Rx radio (0-3)<br>Sx: sector (0-9)<br>Cx channel (0-3) |

The Master Neighbor Table is created by the mesh network device, and it may contain information like in Table 3 below:

TABLE 3

| Neighbor | Radio configuration | Free Channels | Viable Sectors (not including banned sectors or neighbors already connected) |
|---|---|---|---|
| N1 | R0: disconnected<br>R1: S2, C1<br>R2: s9, C0<br>R3: S7, C3 | C2 | (S1, S0) → −69 |
| N2 | R0: S1, C0<br>R1: disconnected<br>R2: disconnected<br>R3: disconnected | C1, C2, C3 | (S9, S9) → −70 |
| N3 | R0: disconnected<br>R1: S3, C3<br>R2: disconnected<br>R3: S6, C0 | C1, C2 | (S0, S9) → −41<br>(S1, S9) → −50<br>(S8, S4) → −61 |

The mesh network device can decide which radio to connect by finding the radio that has the fewest number of neighbors (1 or more) that can connect directly to it (fixed sectors 0-7 only, not UP/DOWN sectors). In the example above, this is R0 (with 2 neighbors). The mesh network device can decide which neighbor to pair with on this radio by finding the neighbor with the fewest fixed radios (via sectors 0-7, not UP/DOWN sectors) it can connect to, including this radio. In this example, it is a tie between N1 and N3 (with 1 radio). If there is a tie between neighbors, the mesh network device can choose the neighbor with the fewest free channels. In this example, it is node 1, channel 2. The mesh network device can update the master neighbor table as shown in the Table 4 below:

TABLE 4

| Neighbor | Radio configuration | Free Channels | Viable Sectors (not including banned sectors or neighbors already connected) |
|---|---|---|---|
| N2 | R0: S1, C0<br>R1: disconnected<br>R2: disconnected<br>R3: disconnected | C1, C3 | (S9, S9) → −70 |
| N3 | R0: disconnected<br>R1: S3, C3<br>R2: disconnected<br>R3: S6, C0 | C1 | (S8, S4) → −61 |

The mesh network device can decide which radio to connect by finding the radio that has the fewest number of neighbors (1 or more) that can connect directly to it (fixed sectors 0-7 only, not UP/DOWN sectors). In this example, there are none. If no radio is found, the mesh network device finds the radio with the fewest free channels. In this example, there is a tie between R1, R2, and R3 since N2, N3 can connect to UP/DOWN sectors only. If there's a tie, the mesh network device can randomly choose the first radio from the shortlisted group. In this example, this is radio R1. The mesh network device can decide which neighbor to pair with on this radio by finding the neighbor with the fewest fixed radios (via sectors 0-7, not UP/DOWN sectors) it can connect to (1 or more), including this radio. In this example, there are none. If no neighbor is found in this step, then all remaining neighbors can connect only via UP or DOWN sectors and the mesh network device can choose the neighbor with the best RSSI. In this example, that is N3, C1. If the master neighbor table were refreshed it would not be empty since N2 was removed because only one radio can connect to the UP/DOWN sectors. However, if this restriction doesn't apply anymore, one radio can connect to the UP sector, and another radio can connect to the DOWN sector. In this case, the mesh network device can update the master neighbor table as shown in the Table 5 below:

TABLE 5

| Neighbor | Radio configuration | Free Channels | Viable Sectors (not including banned sectors or neighbors already connected) |
|---|---|---|---|
| N2 | R0: S1, C0<br>R1: disconnected<br>R2: disconnected<br>R3: disconnected | C3 | (S9, S9) → −70 |

Now that there is only one viable neighbor left, the mesh network device selects its best sector combination. In this example, it is N2, C3. The mesh network device can then determine its final neighbor configuration as shown in the Table 6 below:

TABLE 6

| Radio configuration | Neighbor | RSSI |
|---|---|---|
| R0: S1, C2 | N1 | −69 |
| R1: S8, C1 | N3 | −61 |
| R2: S9, C3 | N2 | −70 |
| R3: disconnected | | |

It should be noted that the RSSI displayed here should show the RSSI value that was heard on the chosen channel during discovery. In a further embodiment, after creating the final neighbor configuration, the mesh network device can re-test the RSSI for each neighbor using the chosen channel. If the RSSI is not acceptable, the mesh network device may need to ban this channel for this particular neighbor and re-do neighbor selection.

Figure 8:
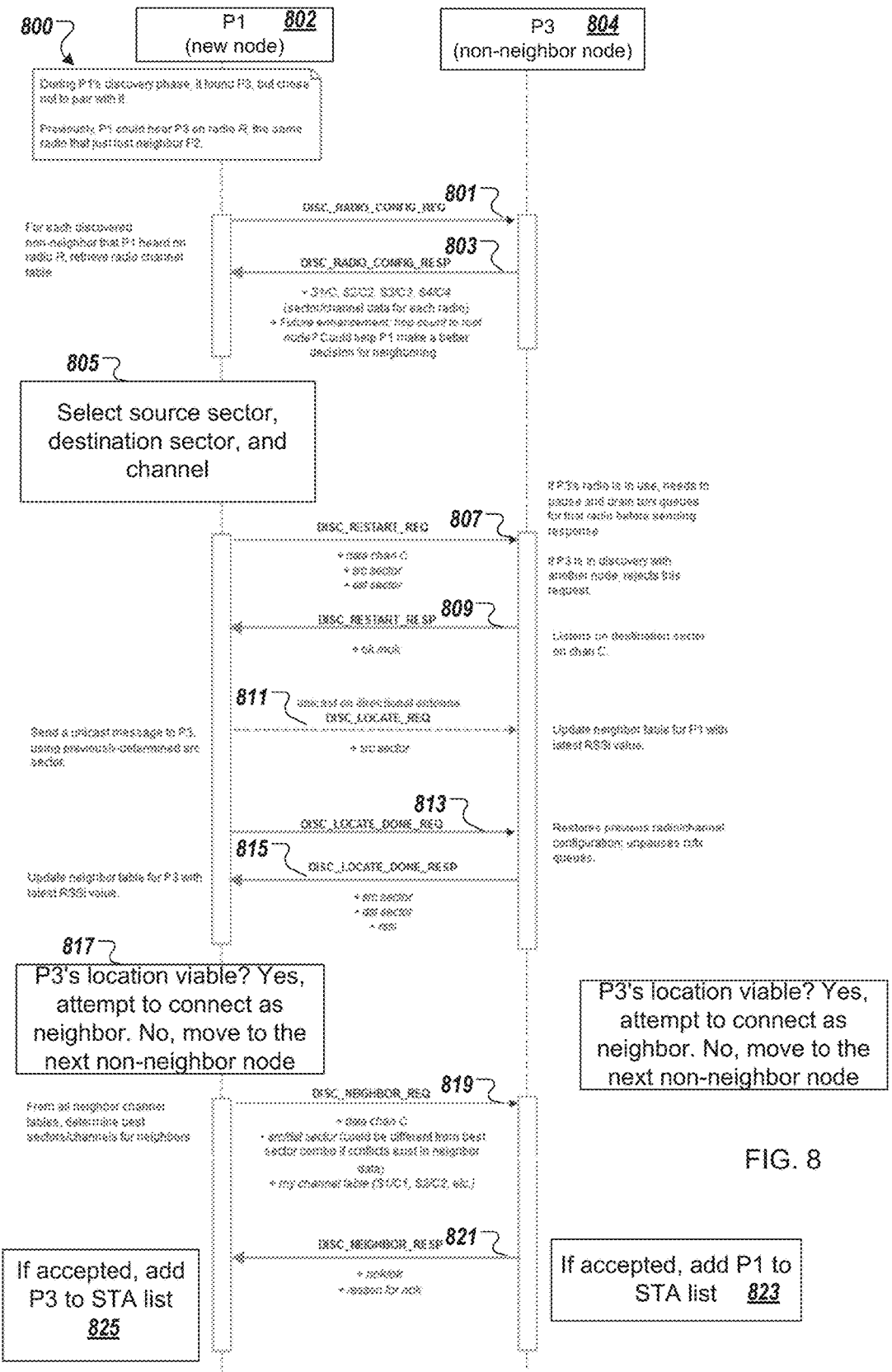
FIG. 8 is a flow diagram of a method of a neighbor replacement process by a mesh network device according to one embodiment.

Also, after the set of neighbor mesh network device is selected, one of the neighbor mesh network device could become unresponsive and the processing logic of the mesh network device 702 can perform a neighbor replacement process, such as described and illustrated in FIG. 8.

FIG. 8 is a flow diagram of a method of a neighbor replacement process by a mesh network device 802 according to one embodiment. The method 800 may be performed by processing logic that includes hardware (e.g., circuitry, dedicated logic, programmable logic, microcode, etc.), software (e.g., instructions executed by a processing device), firmware or a combination thereof. In one embodiment, the method 800 is performed by the mesh network devices 102-106 of FIG. 1. In another embodiment, the method 800 is performed by the mesh network devices 202-208 of FIG. 2. In another embodiment, the mesh node 300 of FIG. 3 performs the method 800. In another embodiment, the SoC 402 of FIG. 4 performs the method 800. Alternatively, an application processor of the mesh network device performs the method 800.

Referring to FIG. 8, during the discovery process, the processing logic of the mesh network device 802 discovered another mesh network device that it did not pair with, referred to a non-neighbor mesh network device 804. The mesh network device 802 could hear the non-neighbor mesh network device 804 on one of the directional radios that just lost the non-responsive mesh network device. The processing logic sends a radio configuration request 801 to non-neighbor mesh network device 804 via the omnidirectional radio. The non-neighbor mesh network device 804 sends a radio configuration response 803 via the omnidirectional radio. The radio configuration response 803 may include a radio configuration table with sector data and channel data for each radio of the non-neighbor mesh network device 804. In one embodiment, the processing logic of the mesh network device 802 selects a source sector, a destination sector, and a channel for the additional mesh network device using the radio configuration table (block 805). For instance, the processing logic can determine if the non-neighbor mesh network device 804 is free on a destination sector previously found. If the destination sector is free and there is at least one compatible channel that is available on the source radio and the destination radio, the processing logic uses this destination sector. If the sector is free and there is an available channel, the nodes can quickly pair, and so begin the neighbor replacement process.

The processing logic of the mesh network device 802 sends a discovery restart request 807 to the non-neighbor mesh network device 804 via the omnidirectional radio to initiate discovery. The restart request 807 may include a source sector identifier, a destination sector identifier, and a channel identifier. The processing logic of the non-neighbor mesh network device 804 determines if the radio is in use. If so, the radio is paused and the data buffers for that radio are drained before sending a response. If the non-neighbor mesh network device 804 is in discovery with another node, the non-neighbor mesh network device 804 rejects the request. The non-neighbor mesh network device 804 sends a discovery restart response 809 via the omnidirectional radio. The discovery restart request 811 may have a positive acknowledgment or negative acknowledgement. In one embodiment, the negative acknowledgement can be triggered by multiple states, such as: (1) IN_DISCOVERY state—the node is already in discovery with another node; (2) AP_BUSY state—the node is too busy for discovery, i.e., it is actively streaming content from one or more radios; or (3) BAD_CHAN state—the node is already using the requested data channel. For state (1) or (2), the mesh network device 802 can set a timer and try again if the reason indicates that the non-neighbor mesh network device 804 is too busy. In another embodiment, the mesh network device 802 can start discovery with another one of the possible neighbor nodes on the list. The third state (3) may occur when the non-neighbor mesh network device 804 added a neighbor between the time that radio configuration response is sent and the neighbor pairing request is received by the non-neighbor mesh network device 804. For the third state (3), the mesh network device 802 can send another radio configuration request to the non-neighbor mesh network device 804.

After a positive acknowledgement from the non-neighbor mesh network device 804, the mesh network device 802 sends a unicast message, including a discovery locate request 811, to the non-neighbor mesh network device 804 using the previously determined source sector. The non-neighbor mesh network device 804 updates its neighbor table with the RSSI value for the mesh network device 802. The processing logic of the mesh network device 802 sends a discovery locate done request 813 to the non-neighbor mesh network device 804 that indicates that mesh network device 802 completed the discovery locate process. The processing logic restores its previous radio channel configuration, un-pauses the data buffer queues, and sends a discovery locate done response 815 to the mesh network device 802 to signal mesh network device 802 to update its neighbor table. The discovery locate done response 815 may include the source sector identifier, the destination sector identifier, and the RSSI value. The mesh network device 802 updates its neighbor table with the latest RSSI value for the non-neighbor mesh network device 804.

The processing logic determines if the non-neighbor mesh network device's location is still viable and attempts to connect the non-neighbor mesh network device 804 as a neighbor mesh network device. If the location is not viable for the non-neighbor mesh network device 804, the mesh network device 802 moves onto the next non-neighbor mesh network device in the list. When the location is viable for the non-neighbor mesh network device 804, the processing logic of the mesh network device 802 sends a neighbor pairing request 819 (labeled discovery neighbor request) to the non-neighbor mesh network device 804 via the omni-directional radio. The neighbor pairing request 819 includes a source sector identifier, a destination sector identifier, a channel identifier, and a radio configuration table for the mesh network device 802. The processing logic of the non-neighbor mesh network device 804 sends a neighbor pairing response 821 with a positive acknowledgement and a MAC address of a corresponding radio of the non-neighbor mesh network device 804 via the omnidirectional radio. If the pairing is accepted, the processing logic of the non-neighbor mesh network device 804 adds the mesh network device 802) to its directional radio's STA list so that it can receive data packets from the mesh network device 802 (block 823). The neighbor pairing response 821 could also include a negative acknowledgment, declining the pairing, and a reason for the rejection. When receiving the positive acknowledgement, the processing logic of the mesh network device 802 adds the non-neighbor mesh network device 804 to the radio's STA list so that it can receive data packets from the non-neighbor mesh network device 804.

In another embodiment of neighbor replacement, an application processor of the mesh network device can already have the second through fifth radios paired with neighbor mesh network devices. In particular, the second radio is paired with the second mesh network device, the third radio is paired with the third mesh network device, the fourth radio is paired with the fourth mesh network device, and the fifth radio is paired with the fifth mesh network device. The application processor can determine that that one of the second, third, fourth, or fifth mesh network device is no longer responsive. The application can send a first request to a sixth mesh network device via the first radio to listen for a unicast message, the first request comprising a source sector identifier that identifies a second source sector at the mesh network device to transmit the unicast message to the sixth mesh network device, a second destination sector identifier that identifies a destination sector at the sixth network device to receive the unicast message from the mesh network device, and a second channel identifier that identifies which of the four channels to transmit the unicast message between the mesh network device and the sixth mesh network device; send the unicast message to the sixth mesh network device using one of the four radios corresponding to the source sector; send a second neighbor pairing request to the sixth network device via the first radio, the second neighbor pairing request comprising the second source sector identifier, the second destination sector identifier, the second channel identifier, and an updated radio configuration table for the mesh network device; and receive a second neighbor pairing response from the sixth mesh network device via the first radio, the second neighbor paring response to confirm establishment of a communication channel between the mesh network device and the sixth mesh network device.

In another embodiment, a mesh network device includes a first radio of a first frequency (e.g., 2.4 GHz) and multiple second radios of a second frequency (e.g., 5 GHz). The mesh network device includes a processing device coupled to each of the radios. The processing device is operable to instruct the first radio to listen for AP beacon frames that include information identifying a respective mesh network device in a WMN. The processing device sends, via the first radio, a first message to a second mesh network device from which an AP beacon frame is received. The first message instructs the second mesh network device to listen for a broadcast message and to measure a metric associated with the broadcast message. The processing device sends, via the first radio, the first message to a third mesh network device from which an AP beacon frame is received. The first message instructs the third mesh network device to listen for a broadcast message and to measure a metric associated with the broadcast message. The processing device sends the broadcast message by each of the radios of the second frequency at the specified channel, one radio at a time. The processing device receives, via the first radio, metrics associated with the broadcast message from the second mesh network device and the third mesh network device and configures a first of the plurality of radios to communicate with the second mesh network device and a second of the plurality of radios to communicate with the third mesh network based on the metrics. The metrics may be any one or more of RSSI values, packet error rate values, SINR values, PDR values, BER values, or RTT values.

In one embodiment, for the neighbor discovery process, the processing device send the broadcast message on a first channel of the plurality of radios, one radio at a time and sends, via the first radio, a second message to the second mesh network device and the third mesh network device. The second message instructs the second mesh network device to listen for a second broadcast message at a second channel and to measure a second metric associated with the second broadcast message. The processing device receives, via the first radio, second metrics associated with the second broadcast message from the second mesh network device and the third mesh network device. The processing device configures the first channel or the second channel of the first one of the second frequency of radios to communicate with the second mesh network device and the second channel or the first channel of the second one of the second frequency of radios to communicate with the third mesh network based on the metrics and the second metrics.

In another embodiment, the processing device sends, via the first radio, a first request to the second mesh network device, receives, via the first radio, a radio configuration table from the second mesh network device, and sends, via the first radio, a second request to the third mesh network device. The processing device receives, via the first radio, a radio configuration table from the third mesh network device.

In another embodiment, for the neighbor selection process, the processing device selects a number of neighbor mesh network device with highest RSSI values. The number is equal to a number of the second radios. The processing device receives, via the first radio, a radio channel table from the second mesh network and a radio channel from the third mesh network device, wherein the radio channel tables each comprise a RSSI value for each radio of the respective device that received the broadcast message. The processing device configures the first one of the second frequency of radios to communicate with a radio of the second mesh network device based on a first highest RSSI value in the radio channel tables and configures the second one of the second frequency of radios to communicate with a radio of the third mesh network device based on a second highest RSSI value in the radio channel tables. The processing device sends, via the first radio, a first pairing request to the second mesh network device to pair the first radio to the radio of the second mesh network device and sends, via the first radio, a second pairing request to the third mesh network device to pair the second radio to the radio of the third mesh network device. The processing device can store first pairing and the second pairing in a local radio channel for the mesh network device.

In one embodiment, for a neighbor replacement process, the processing device determines that one of the set of neighbor mesh network devices is no longer responsive. For example, the processing device can determine that the second mesh network device is no longer responsive The processing device sends a third message to a fourth mesh network device form which an AP beacon frame is received. The third message instructs the fourth mesh network device to list for a unicast message and to measure a third metric associated with the unicast message. The processing device sends the unicast message by the first one of the second frequency of radios that is configured to communicate with the second mesh network device that is no longer responsive. The processing device receives, via the first radio, the third metric associated with the unicast message from the second mesh network device. The processing device reconfigures the first of the plurality of radios to communicate with the fourth mesh network device based on the third metric.

In one embodiment, the first radio is coupled to an omnidirectional antenna and the second frequency of radios are four radios, each being configured to communicate via two sectors of a sector group, each sector group including a directional antenna. The second frequency of antennas includes a second radio, a third radio, a fourth radio, and a fifth radio. Alternatively, other frequencies and/or types of radios may be used. In a further embodiment, the processing device instructs the first radio to listen on all channels for the AP beacon frames. The processing device may verify that each of the AP beacon frames is sent by a mesh network device in the WMN and a RSSI value in the respective AP beacon frame is above a threshold. The processing device determines an identifier for each of mesh network devices in the WMN having an RSSI value above the threshold. As described above, the processing device can ix) send a neighbor pairing request to the second mesh network device via the first radio, the neighbor pairing request comprising: (1) a source sector identifier that identifies a source sector at the mesh network device to exchange data with the second mesh network device, (2) a destination sector identifier at the second mesh network device to exchange the data with the mesh network device, (3) a channel identifier that identifies which of the first channel, the second channel, the third channel, or the fourth channel to exchange the data between the mesh network device and the second mesh network device, and (4) a media access control (MAC) address of the second radio, and a radio configuration table for the mesh network device; x) receive a neighbor pairing response from the second mesh network device via the first radio, the neighbor pairing response to confirm establishment of a communication channel between the second radio of the mesh network device and first radio of the second mesh network device; and xi) repeat steps ix) and x) for a third mesh network device for the third radio, a fourth mesh network device for the fourth radio, and a fifth network device for the fifth radio.

In a further embodiment, the processing device can ix) scan for the 5 GHz mesh frame on the first channel of the second radio and the first channel of the third radio; x) send a second discovery request frame to the first radio of the second mesh network device on the unused channel via the second radio and the third radio, wherein during steps ix) and x), the second radio is selectively coupled to a fifth one of the plurality of directional antennas and the third radio is selectively coupled to a sixth one of the plurality of directional antennas; xi) receive a second response frame from the second mesh network device, in response to the second discovery request frame, via the unused channel on the unused radio of the second mesh network device, the response frame including a third source sector identifier that identifies from which sector the second response frame is transmitted; xii) determine a third signal strength indicator (RSSI) value corresponding to the second response frame; xiii) update a radio configuration table associated with the mesh network device to include the third RSSI value; and xiv) repeat steps ix) through xiii) on the second channel, the third channel, and the fourth channel instead of the first channel.

In a further embodiment, the processing device sends a radio configuration request to each of the possible neighbor devices in the list via the omnidirectional radio and receives a radio configuration response from each of the possible neighbor devices in the list via the omnidirectional radio, each of the radio configuration responses including a radio configuration table comprising sector data and channel data for each radio of the respective one of the possible neighbor devices in the list. The processing device selects a source sector, a destination sector, and a channel for at most four of the possible neighbor devices in the list using the radio configuration tables. The processing device sends a neighbor pairing request to the at most four of the possible neighbor devices via the omnidirectional radio, each of the neighbor pairing request including a source sector identifier, a destination sector identifier, a channel identifier, a MAC address of the corresponding one of the four directional radios, and a radio configuration table for the respective device. The processing device receives a neighbor pairing response with a positive acknowledgement and a MAC address of a corresponding radio of the respective neighbor device via the omnidirectional radio. It should be noted that in the embodiments described above, there is an assumption of one radio per neighbor. In other embodiments the processing logic can select more or less neighbor devices than four neighbor mesh network devices.

In a further embodiment of neighbor replacement, the processing device sends a radio configuration request to an additional mesh network device that is not currently an actual neighbor device via the omnidirectional radio and receives a radio configuration response from the additional mesh network device via the omnidirectional radio. The radio configuration response includes a radio configuration table comprising sector data and channel data for each radio of the additional mesh network device. The processing device selects a source sector, a destination sector, and a channel for the additional mesh network device using the radio configuration table and sends a restart request to the additional mesh network device via the omnidirectional radio. The restart request includes a source sector identifier, a destination sector identifier, and a channel identifier. The processing device receives a restart response with a positive acknowledgement from the additional mesh network device via the omnidirectional radio and sends a unicast message using one of the four directional radios corresponding to the source sector. The processing device sends a neighbor pairing request to the additional mesh network device via the omnidirectional radio, the neighbor pairing request including a source sector identifier, a destination sector identifier, a channel identifier, and a radio configuration table for the additional mesh network device. The processing device receives a neighbor pairing response with a positive acknowledgement from the additional mesh network device via the omnidirectional radio.

In some embodiment, the mesh network device includes six sectors and four directional radios. Each of the six sectors includes a directional antenna and each of the four directional radios is assigned to four sectors (i.e., configured to communicate via the respective antenna(s) at the two of the six sectors). In another embodiment, the mesh network device includes eight or ten sectors and four directional radios. The eight or ten sectors may include eight horizontal sectors and two vertical sectors. Each of the four directional radios is assigned to two of the eight horizontal sectors, and any one of the four directional radios is assignable to any one of the two vertical sectors.

It should be noted that the omnidirectional radio can operate at 2.4 GHz or 5 GHz. Using 2.4 GHz, a hidden node problem may be avoided and a channel is configurable by a user, but the mesh network device should inform neighbor nodes of channel switch on omnidirectional radio. Using 2.4 GHz, the mesh network device could inform regular (non-mesh) clients of channel switch when discovering other nodes, if those other nodes are sending beacon frames on a different channel. In other cases, it may not be necessary for the AP to inform the associated STAs to switch to a new channel via CSA when doing a background scan because the AP would have to switch back to the operational channel within 100 ms for the next TBTT. Using 5 GHz, the radio will have to shut off when all four channel are in use by the directional radios before sending the locate probe transmissions.

It should also be noted that in some cases the mesh network device cannot pair with any of its neighbors. In this case, the mesh network device can use its LTE radio to establish its own network. In another case, the mesh network device can force a neighbor node to drop one of its own neighbors and pair with the mesh network device instead. In another embodiment, a MNCS can handle reconfiguration of the neighbor selections amongst the mesh network device in the WMN.

Figure 9:
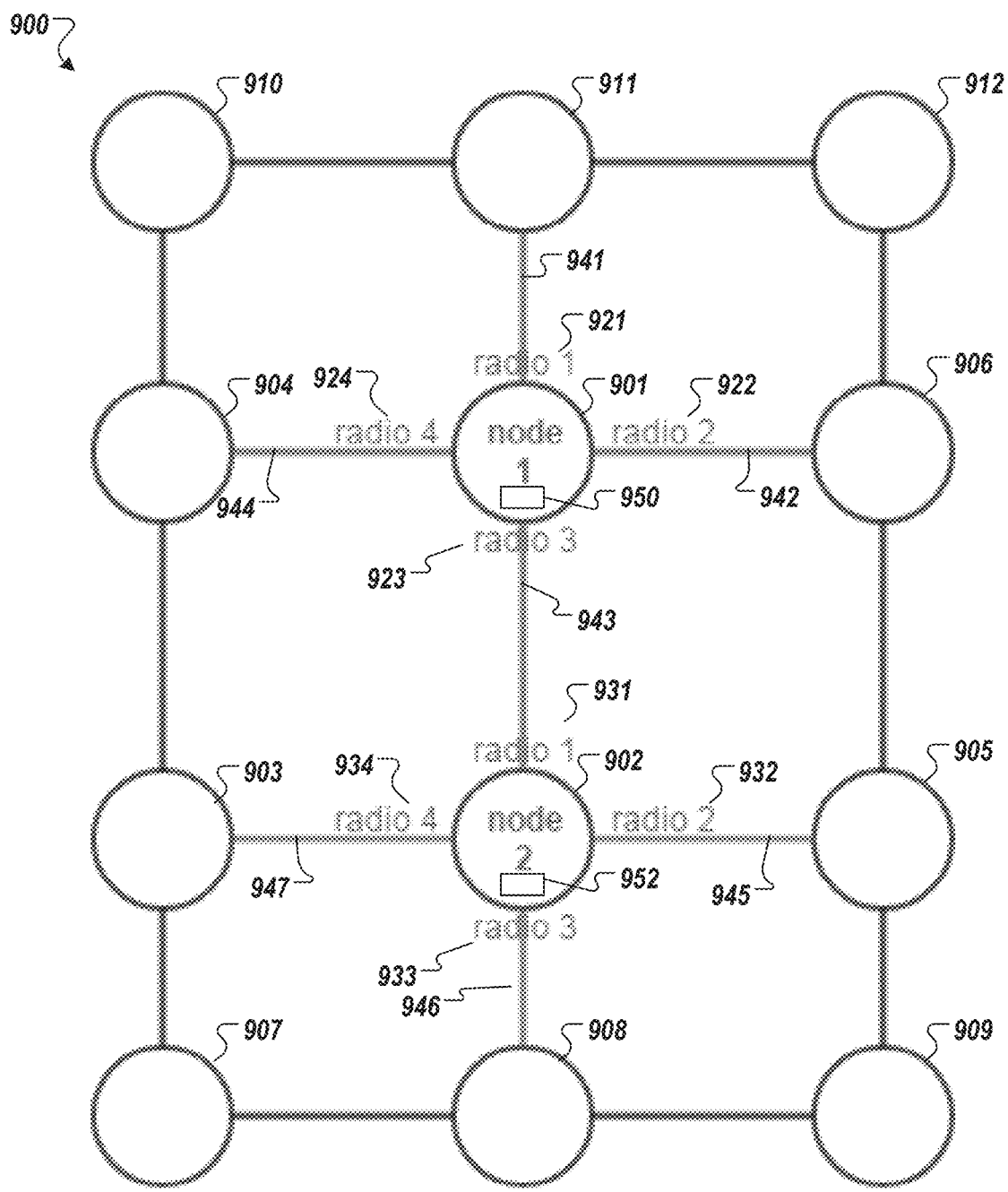
FIG. 9 is a diagram of a WMN with twelve network hardware devices, each having four radios to form a network backbone of peer-to-peer (P2P) wireless connections according to one embodiment.

Once the neighbor discovery process (e.g. method 616 of FIG. 6C) and the neighbor selection process (e.g., method 700 of FIG. 7) are completed, the mesh network devices can form a network backbone of the WMN, where each mesh network device is coupled to one or more neighbor mesh network devices, such as illustrated and described with respect to FIG. 9.

FIG. 9 is a diagram of a WMN 900 with twelve network hardware devices, each having four radios to form a network backbone of peer-to-peer (P2P) wireless connections according to one embodiment. The WMN 900 includes multiple network hardware devices 901-912, referred to as nodes 901-912 for ease of description. In other embodiments, the WMN 900 may include more or less devices than twelve. The nodes 901-912 may be considered mesh routers that include four radios (e.g., four 5 GHz radios) for the network backbone for multiple connections with other mesh routers. For example, an eleventh node 911 may be located to the north of the first node 901 and connected over a first wireless connection 941 (e.g., 5 GHz connection). The sixth node 906 may be located to the east of the first node 901 and connected over a second wireless connection 942. The second node 902 may be located to the south of the first node 901 and connected over a third wireless connection 943. The fourth node 904 may be located to the west of the first node 901 and connected over a fourth wireless connection 944. In other embodiments, additional network hardware devices can be connected to other wireless connections of the first node 901. Similarly, the second node 902 can be connected to a third node 903 over a wireless connection 947, a fifth node 905 over a wireless connection 945, and an eighth node 908 over a wireless connection 946. It should also be noted that the nodes 903-912 may also connect to other nodes using its respective radios. It should also be noted that the locations of the nodes 901-912 can be in other locations than north, south, east, and west. For example, the nodes can be located above or below the first node 901, such as on another floor of a building or house.

The first node 901 includes a first radio 921, a second radio 922, a third radio 923, and a fourth radio 924. The first node 901 may also include at least one radio to establish a wireless connection (e.g., 2.4 GHz) with one or more client consumption devices. The first node 901 may operate as a mesh router that has four radios operating concurrently or simultaneously to transfer mesh network traffic, as well as a radio to service connected client consumption devices. This may require that the 5GLL and 5GLH to be operating simultaneously and the 5GHL and 5GHH to be operating simultaneously, as described in more detail below. The second node 902 includes a first radio 931, a second radio 932, a third radio 933, and a fourth radio 934. The second node 902 may also include at least one radio to establish a wireless connection (e.g., 2.4 GHz) with one or more client consumption devices. The second node 902 may operate as a mesh router that has four radios operating concurrently or simultaneously to transfer mesh network traffic, as well as a radio to service connected client consumption devices.

For routing data traffic between nodes 901-912, a MUL architecture is used for routing decisions where each node implements a MUL. The MULs 950, 952 have been illustrated in the first node 901 and the second node 902, respectively. The other nodes implement a MUL, although not illustrated and labeled. The MUL is a link layer protocol that interacts with the underlying physical (PHY) layer of the radios. For each node, there are four radios to serve the mesh backbone. Each physical radio is assigned its own media access control (MAC). A MAC address, also called physical address, is a unique identifier assigned to network interfaces for communications on the physical network segment. MAC addresses are used as a network address for most IEEE 802 network technologies. A node MAC address is assigned to each node and each node represents a virtual interface that can be assigned the node MAC address. Routing decisions can be made with this node MAC address. The node's multiple radios can also be assigned MAC address according to an MAC address assignment scheme. In one embodiment, a first portion of the MAC address (e.g., the most significant 45 bits of a 48-bit MAC address) can be fixed and an assignment of a second portion of the MAC address can be assigned to the virtual interface for the node and the individual radios. In this embodiment, there are 7 MAC addresses. Table 7 below illustrates an exemplary address assignment scheme for this embodiment.

TABLE 7

| Last 3 Bits of MAC address | MAC Address assignment |
| --- | --- |
| 0 | Node (Virtual Interface) |
| 1 | Radio 1 (directional) |
| 2 | Radio 2 (directional) |
| 3 | Radio 3 (directional) |
| 4 | Radio 4 (directional) |
| 5 | Omni 2.4 GHz Radio |
| 6 | Omni 5 GHz Radio |
| 7 | Reserved |

In this embodiment, it is assumed that each mesh node has 4 radios and each radio may communicate with at most one neighbor node. A neighbor node is a node to which a node has established a wireless connection, such as a P2P wireless connection, without any intervening nodes between the node and the neighbor node. In this embodiment, the first node 901 includes four neighbor nodes, including the eleventh node 911 over the first wireless connection 941, the sixth node 906 over the wireless connection 942, the second node 902 over the third wireless connection 943, and the fourth node 904 over the fourth wireless connection 944. In one embodiment, the WMN 900 implements the IEEE 802.11s mesh implementation for defining how wireless devices can interconnect to create a WLAN mesh network. The 802.11 is a set of IEEE standards that govern wireless networking transmission methods. They are commonly used today in their 802.11a, 802.11b, 802.11g, and 802.11n versions to provide wireless connectivity in the home, office and some commercial establishments. The 802.11s is an IEEE 802.11 amendment for mesh networking.

In one embodiment, the MUL 950 sits on top of the four radios 921-924 and acts as a virtual interface for the first node 901. The MUL 950 owns the node MAC address. The MUL 950 keeps a list of the four radio network devices (abbreviated "radio netdevs"). The MUL 950 is also considered a netdev for an operating system's data stack for routing data traffic to and from the four radio netdevs. The MUL 950 creates and maintains a master routing table. In particular, the MUL 950 consolidates local routing tables from all four radios into the master routing table. The MUL 950 prioritizes routing based on a metric reported by the individual radios in the local routing tables. During operation, the MUL 950 decides to which radio of the first node 901 to forward the frames. At most, there are four different routes to a single destination node, as described herein.

In one embodiment, the MUL 950 operates in a control plane and in a data plane. Operations by the MUL in control plane may include peering, path discovery, and messaging (such as to pause or resume radios), as described herein. In the data plane, the MUL 950 decides to which radio to forward the frame based on the master routing table for transmitting data. All frames received by the individual radios go to the MUL for forwarding decisions as described in more detail below.

It should be noted that although the depicted embodiment illustrates and describes twelve mesh nodes, in other embodiments, more than twelve mesh nodes may be used in the WMN 900. It should be noted that FIG. 9 is a simplification of neighboring mesh network devices for a given mesh network device. The deployment of forty or more mesh network device may actually be located at various directions than simply north, south, east, and west as illustrated in FIG. 9. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 10:
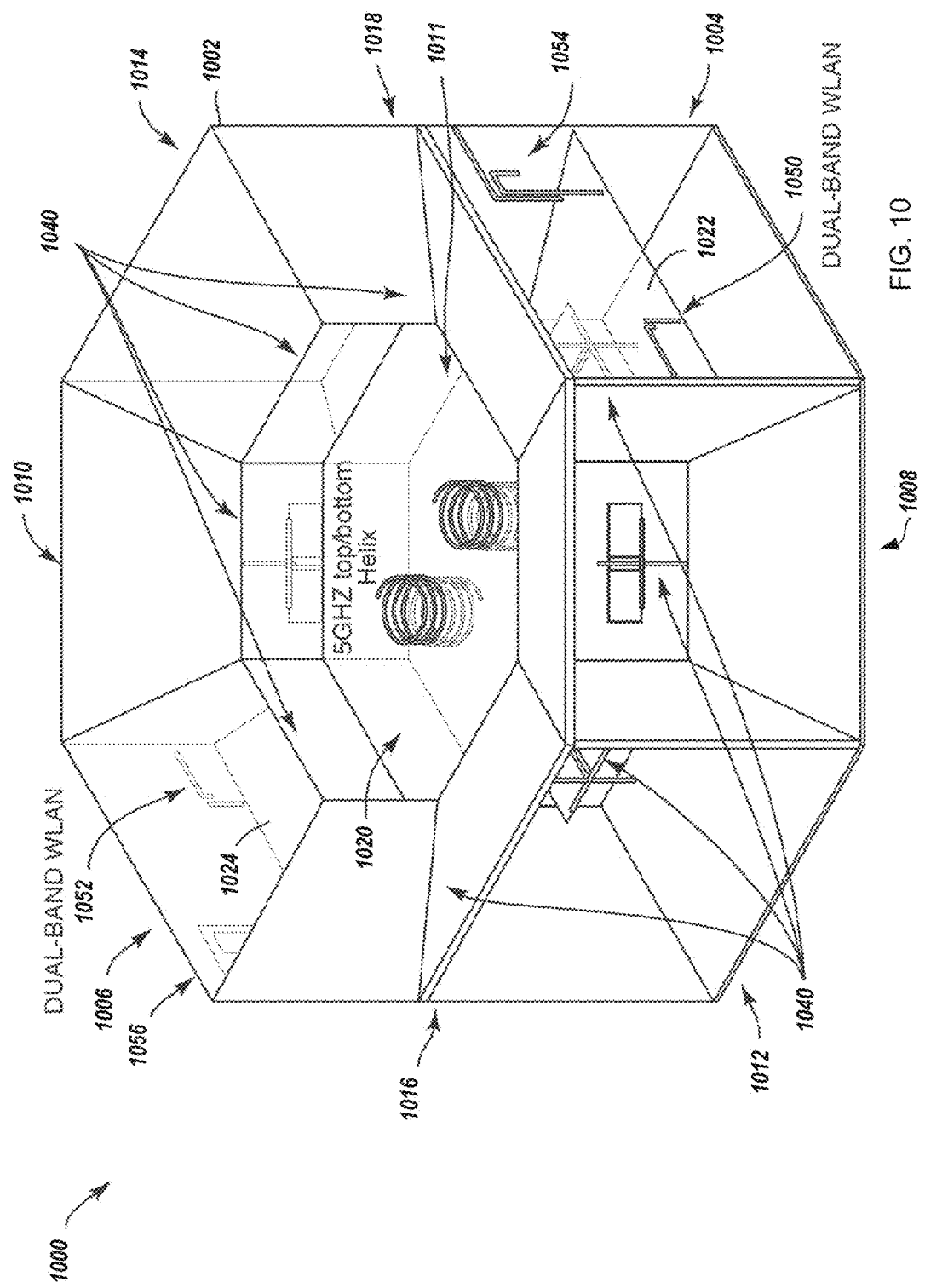
FIG. 10 illustrates a multi-radio, multi-channel (MRMC) network device according to one embodiment.

FIG. 10 illustrates a multi-radio, multi-channel (MRMC) network device 1000 according to one embodiment. The MRMC network device 1000 includes a metal housing 1002 that has eight sectors 1004-1018. Each of the eight sectors 1004-1018 has a truncated pyramid structure with a top portion and four side portions that define a recessed region of the respective truncated pyramid structure. The truncated pyramid structures are disposed on their sides in a horizontal plane and arranged in a circular arraignment with two adjacent sectors sharing at least one common side portion. The truncated pyramid structure may form an octagonal prism for the metal housing 1002. The top portion and the four side portions may be metal surfaces or have portions of metal. Also, the outer top surfaces of the eight sectors form an inner chamber 1011 in a center of the metal housing 1002. In particular, the sector may be considered a reflective chamber that includes an top portion, a first side portion, a second side portion, a third side portion, and a fourth side portion. The other sectors 1004, 1006, 1010, 1012, 1014, 1016, and 1018 may have similar metal portions or surfaces as reflective chambers as the sector 1008. Similarly, the inner chamber 1011 can be considered reflective. For example, a circuit board 1020 includes a metal ground plane that is a reflective surface for the top antenna, as well as for the bottom antenna. The opposite sides of the metal surfaces of the reflective chambers also are reflective for the top and bottom antennas.

In the depicted embodiment, the MRMC network device 1000 includes a circuit board 1020 disposed within the metal housing 1002. In particular, the circuit board 1020 may include multiple portions, such as a first portion disposed in the inner chamber 1011. There may be a second portion of the circuit board 1020 disposed within a first sector 1004 and a third portion of the circuit board 1020 disposed within a second sector 1006. These portions may extend to an outer side of the metal housing 1002. The circuit board 1020 may also include smaller portions that are disposed in the other sectors 1008-1018 to accommodate some of the antenna pairs disposed within the respective sectors.

In the depicted embodiment, the MRMC network device 1000 includes eight pairs of antennas 1040, each pair being disposed in one of the eight sectors 1004-1018. Each pair includes a horizontal orientation antenna and a vertical orientation antenna. The eight pairs of antennas 1040 may be disposed on, above, or below corresponding sections of the circuit board 1020. In one embodiment, each of the eight pairs of antennas 1040 is a pair of cross polarized dipole antennas, a pair of vertical polarized dipole antennas, or a pair of cross polarized patch antennas.

In some embodiments, the MRMC network device 1000 includes a top antenna disposed on a top side of the circuit board 1020 within the inner chamber 1011 and a bottom antenna disposed on a bottom side of the circuit board 1020 within the inner chamber 1011. In the depicted embodiment, top antennas 1042, 1044 are disposed above the circuit board 1020, and bottom antennas 1046, 1048 are disposed below the circuit board 1020. The top antennas 1042, 1044 and the bottom antennas 1046, 1048 are helix coil antennas. In other embodiments, the top and bottom antennas may be other types of antennas, such as patch antennas, monopoles, dipoles, loops, folded monopoles, or the like.

In the depicted embodiment, the eight pairs of antennas 1040, the top antennas 1042, 1044, and the bottom antennas 1046, 1048 are design to radiate electromagnetic energy in a first frequency range, such as the 5 GHz band of the Wi-Fi® technologies. The metal of the top portion and the four side portions of each of the eight sectors operate as a reflector chamber. For example, the metal of the top portion 1030 and the four side portions 1032-1038 of the sector 1008 operate as a reflector chamber for the pair of antennas 1040 within the respective chamber. The reflective chamber reflects the electromagnetic energy, radiated by the horizontal orientation antenna, in a first directional radiation pattern with high gain in a direction along a center axis of the sector 1008 (e.g., a truncated pyramid structure) and reflects the electromagnetic energy, radiated by the vertical orientation antenna, in a second directional radiation pattern with high gain in the direction along the center axis of the sector 1008. The gain the first direction is considered higher than the gain in other directions, such as an opposite direction than the first direction. The number of metal surfaces may impact the gain in the first direction. As few as one metal surface can be used to reflect the electromagnetic energy. However, if more than three metal surfaces, the gain in the first direction can be increased.

In the depicted embodiment, the MRMC network device 1000 includes a first omnidirectional antenna 1050 (e.g., dual-band WLAN antenna) disposed on the top side of the second portion of the circuit board 1020 disposed within the sector 1004 (i.e., a first of the eight sectors). In a further embodiment, a second omnidirectional antenna 1052 is disposed on the top side of the third portion of the circuit board 1020 disposed within the sector 1006 (i.e., a second of the eight sectors). The first omnidirectional antenna 1050 and the second omnidirectional antenna 1052 are designed to radiate electromagnetic energy in the first frequency range (e.g., 5 GHz band) and a second frequency range (e.g., 2.4 GHz band).

In the depicted embodiment, the MRMC network device 1000 includes a first cellular antenna 1054 (e.g., WWAN antenna) disposed on the top side of the second portion of the circuit board 1020 disposed within the sector 1004 (i.e., a first of the eight sectors). In a further embodiment, a second cellular antenna 1056 is disposed on the top side of the third portion of the circuit board 1020 disposed within the sector 1006 (i.e., a second of the eight sectors). The first cellular antenna 1054 and the second cellular antenna 1056 are designed to radiate electromagnetic energy in a third frequency range. For examples, the third frequency range may be the 900 MHz band for the 2G specification, the 1800 MHz band for the 2G specification, the B1 band for the 3G specification, the B8 band for the 3G specification, or the B40 band for the LTE specification.

In the depicted embodiment, the MRMC network device 1000 includes a first RF radio (not illustrated in FIG. 10) disposed on the circuit board 1020 and coupled to the first cellular antenna 1054 and the second cellular antenna 1056. The first RF radio causes the first cellular antenna 1054, the second cellular antenna 1056, or both to radiate the electromagnetic energy in the third frequency range. In a further embodiment, multiple RF radios (not illustrated in FIG. 10) are disposed on the circuit board 1020 and coupled to the eight pairs of antennas 1040, the top antennas 1042, 1044, and the bottom antennas 1046, 1048. The RF radios cause different combinations of one or more of the eight pairs of antennas 1040, the top antennas 1042, 1044, and the bottom antennas 1046, 1048 to radiate the electromagnetic energy in the first frequency range (e.g., 2.4 GHz band). In a further embodiment, a second RF radio (not illustrated in FIG. 10) is disposed on the circuit board 1020 and coupled to the first omnidirectional antenna 1050 and the second omnidirectional antenna 1052. The second RF radio cause the first omnidirectional antenna 1050, the second omnidirectional antenna 1052, or both to radiate the electromagnetic energy in the first frequency range (e.g., 5 GHz band).

In the depicted embodiment, the MRMC network device 1000 includes a third RF radio (not illustrated in FIG. 10) disposed on the circuit board 1020 and coupled to the first omnidirectional antenna 1050 and the second omnidirectional antenna 1052. The second RF radio cause the first omnidirectional antenna 1050, the second omnidirectional antenna 1052, or both to radiate the electromagnetic energy in the second frequency range (e.g., 2.4 GHz band).

Figure 11:
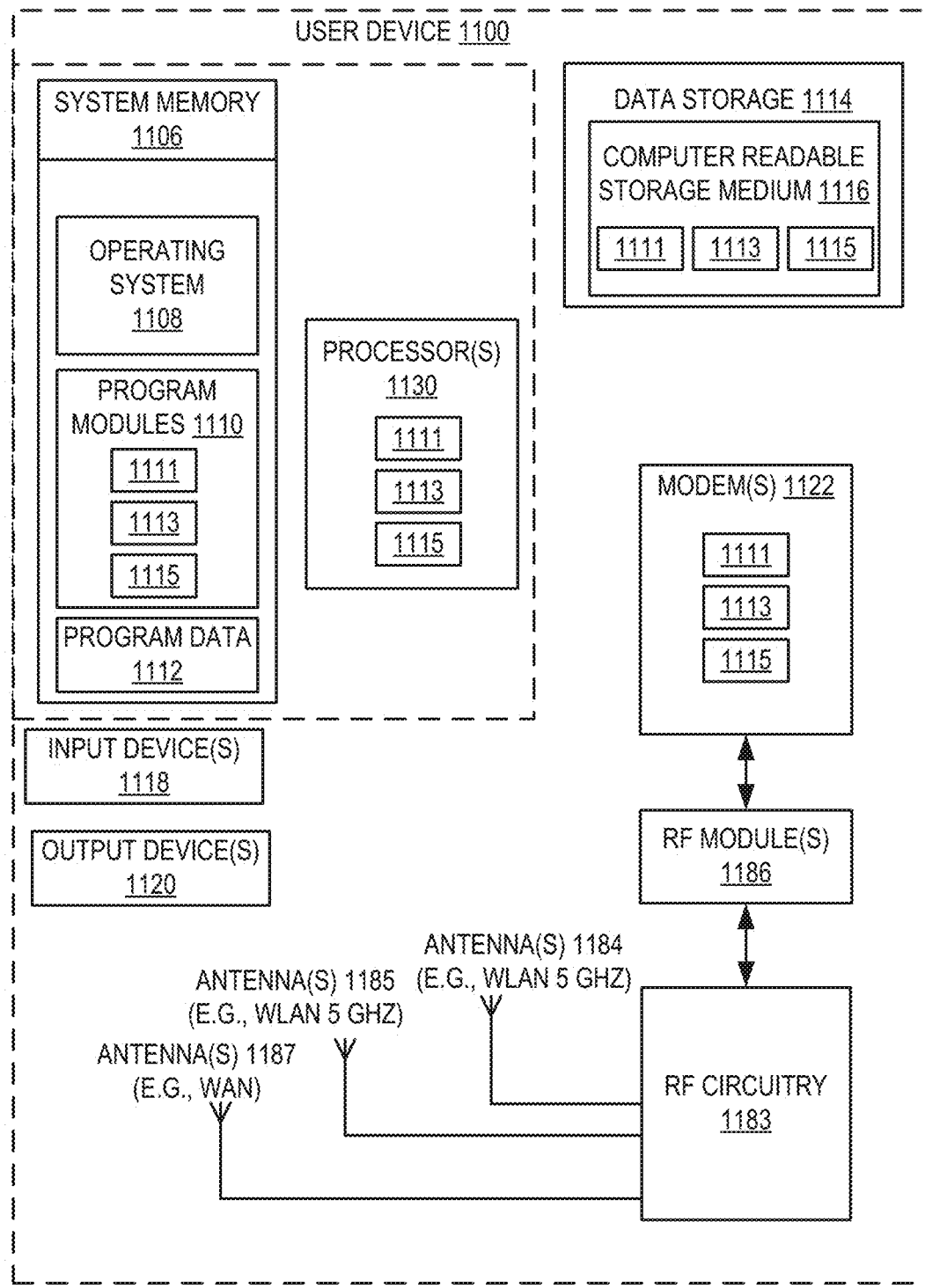
FIG. 11 is a block diagram of a network hardware device according to one embodiment.

FIG. 11 is a block diagram of a network hardware device 1100 according to one embodiment. The network hardware device 1100 may correspond to the network hardware devices 102-110 of FIG. 1. In another embodiment, the network hardware device 1100 may correspond to the network hardware devices 202-210 in FIG. 2. In another embodiment, the network hardware device 1100 may correspond to the mesh node 300 of FIG. 3. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. In one embodiment, the system memory 1106 stores instructions of methods to control operation of the network hardware device 1100. The network hardware device 1100 performs functions by using the processor(s) 1130 to execute instructions provided by the system memory 1106. In one embodiment, the program modules 1110 may include a neighbor discovery module 1111, a neighbor selection module 1113, and a neighbor replacement module 1115. The neighbor discovery module 1111 may perform the neighbor discovery process described herein (e.g., method 600 of FIG. 6A and/or method 616 of FIG. 6C). The neighbor selection module 1113 may perform the neighbor selection process described herein (e.g., method 700 of FIG. 7). The neighbor replacement module 1115 may perform the neighbor replacement process described herein (e.g., method 800 of FIG. 8). Alternatively, the modules 1111-1115 may be implemented in a single module or multiple modules.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 (e.g., 1111, 1113, 1115) may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more RF modules 1186. The RF modules 1186 may be a WLAN module, a WAN module, PAN module, GPS module, or the like. The antenna structures (antenna(s) 1184, 1185, 1187) are coupled to the RF circuitry 1183, which is coupled to the modem 1122. The RF circuitry 1183 may include radio front-end circuitry, antenna switching circuitry, impedance matching circuitry, or the like. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4

GHz), and/or antenna(s) 1187 of a third type (e.g., WAN), via RF circuitry 1183, and RF module(s) 1186 as descried herein. Antennas 1184, 1185, 1187 may be configured to transmit in different frequency bands and/or using different wireless communication protocols. The antennas 1184, 1185, 1187 may be directional, omnidirectional, or non-directional antennas. In addition to sending data, antennas 1184, 1185, 1187 may also receive data, which is sent to appropriate RF modules connected to the antennas. One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A mesh network device comprising:
   a first radio coupled to an omnidirectional antenna;
   a second radio selectively coupled to any one of a plurality of directional antennas;
   a third radio selectively coupled to any one of the plurality of directional antennas;
   a fourth radio selectively coupled to any one of the plurality of directional antennas;
   a fifth radio selectively coupled to any one of the plurality of directional antennas; and
   an application processor coupled to the first radio, the second radio, the third radio, the fourth radio, and the fifth radio, wherein the application processor is to:
   i) receive, via the first radio, a 2.4 GHz beacon frame from a second mesh network device, the 2.4 GHz beacon frame including a first informational element identifying the second mesh network device as an available access point in a wireless mesh network (WMN);
ii) listen, for a defined time period, on a first channel of the second radio, a first channel of the third radio, a first channel of the fourth radio, and a first channel of the fifth radio;
iii) repeat step ii) on a second channel, a third channel, and a fourth channel for each of the second radio, the third radio, the fourth radio, and the fifth radio;
iv) in response to steps ii) and iii), receive, via the second radio, a 5 GHz mesh frame from the second mesh network device, the 5 GHz mesh frame including an identifier (ID) of the second mesh network device;
v) compare the first informational element to the ID to determine a sector identifier that identifies a first antenna from which the 5 GHz mesh frame was transmitted, a first signal strength indicator (RSSI) value corresponding to the 5 GHz mesh frame, an unused radio and an unused channel of the second mesh network device, wherein the unused radio and the unused channel are not currently utilized by the second mesh network device;
vi) send a discovery request frame to the unused radio of the second mesh network device on the unused channel via each of the second radio, the third radio, the fourth radio, and the fifth radio, wherein during ii) and vi), the second radio is selectively coupled to the first one of the plurality of directional antennas, the third radio is selectively coupled to the second one of the plurality of directional antennas, the fourth radio is selectively coupled to the third one of the plurality of directional antennas, and the fifth radio is selectively coupled to the fourth one of the plurality of directional antennas;
vii) receive a locate probe from the second mesh network device on the unused channel, in response to the discovery request frame, via at least one of the first radio, the second radio, the third radio, or the fourth radio, the locate probe including a source sector identifier that identifies a second antenna from which the locate probe is transmitted; and
viii) determine a second signal strength indicator value corresponding to the locate probe.

2. The mesh network device of claim 1, wherein the application processor is further to:
ix) send a neighbor pairing request to the second mesh network device via the first radio, the neighbor pairing request comprising:
  (1) a source sector identifier that identifies a source antenna at the mesh network device to exchange data with the second mesh network device,
  (2) a destination sector identifier at the second mesh network device to exchange the data with the mesh network device,
  (3) a channel identifier that identifies which of the first channel, the second channel, the third channel, or the fourth channel to exchange the data between the mesh network device and the second mesh network device, and
  (4) a media access control (MAC) address of the second radio and a radio configuration table for the mesh network device;
x) receive a neighbor pairing response from the second mesh network device via the first radio, the neighbor pairing response to confirm establishment of a communication channel between the second radio of the mesh network device and first radio of the second mesh network device; and
xi) repeat steps ix) and x) for a third mesh network device for the third radio, a fourth mesh network device for the fourth radio, and a fifth network device for the fifth radio.

3. The mesh network device of claim 1, wherein the application processor is further to:
ix) scan for the 5 GHz mesh frame on the first channel of the second radio and the first channel of the third radio;
x) send a second discovery request frame to the first radio of the second mesh network device on the unused channel via the second radio and the third radio, wherein during steps ix) and x), the second radio is selectively coupled to a fifth one of the plurality of directional antennas and the third radio is selectively coupled to a sixth one of the plurality of directional antennas;
xi) receive a second response frame from the second mesh network device, in response to the second discovery request frame, via the unused channel on the unused radio of the second mesh network device, the response frame including a third source sector identifier that identifies from which antenna the second response frame is transmitted;
xii) determine a second RSSI value corresponding to the second response frame;
xiii) update a radio configuration table associated with the mesh network device to include the second RSSI value; and
xiv) repeat steps ix) through xiii) on the second channel, the third channel, and the fourth channel instead of the first channel.

4. A mesh network device comprising:
a first radio associated with a first frequency;
a plurality of radios associated with a second frequency that is different than the first frequency; and
a processing device coupled to the first radio and the plurality of radios, wherein the processing device is to:
  receive, via the first radio, a first beacon frame from a second mesh network device;
  receive, via a first of the plurality of radios, a first mesh frame identifying the second mesh network device;
  determine, from the first beacon frame or the first mesh frame, a first sector identifier that identifies from which antenna the first mesh frame is transmitted, a first signal strength indicator (RSSI) value corresponding to the first mesh frame, an unused radio of the second mesh network device, and an unused channel of the second mesh network device;
  send a first message to the unused radio of the second mesh network device on the unused channel via the first of the plurality of radios;
  receive a second message from the second mesh network device via the first of the plurality of radios; and
  configure a first of the plurality of radios to communicate with the second mesh network device based on the second message.

5. The mesh network device of claim 4, wherein, the processing device is further to:
receive, via the first radio, a second beacon frame from a third mesh network device, wherein the second beacon frame comprises a first identifier (ID) that identifies the third mesh network device;

scan, using the plurality of radios, for a second mesh frame corresponding to the third mesh network device;

receive, via the plurality of radios, the second mesh frame, wherein the second mesh frame comprises a second ID that identifies the third mesh network device;

determine that the first ID and the second ID match; and determine a second sector identifier that identifies from which antenna the second mesh frame is transmitted, a second RSSI value corresponding to the second mesh frame, an unused channel of the third mesh network device, and an unused radio of the third mesh network device, wherein the second beacon frame identifies the unused radio of the third mesh network device.

6. The mesh network device of claim 5, wherein the second beacon frame comprises data about a node state corresponding to the third mesh network device, wherein the node state is one of: initializing (initing), discovering, linkable, linked, linkable radios connected, or linkable fully connected, wherein the processing device is further to:

determine that the node state corresponding to the third mesh network device is linkable; and configure a second of the plurality of radios to communicate with the third mesh network device based on the determination.

7. The mesh network device of claim 4, wherein, to configure the first of the plurality of radios, the processing device is to:

determine a second RSSI value corresponding to the second message;

configure the first of the plurality of radios to communicate with a radio of the second mesh network device based on a highest RSSI value in a radio channel table associated with the mesh network device, wherein the radio channel table comprises a list of neighbor mesh network devices, corresponding radios, and corresponding RSSI values;

send, via the first radio, a pairing request to the second mesh network device to pair the first of the plurality of radios to the radio of the second mesh network device, wherein the pairing request comprises the radio channel table;

receive, via the first radio, an indication that the pairing request was accepted by the second mesh network device; and update the radio channel table to include pairing data associated with the pairing request.

8. The mesh network device of claim 4, further comprising a first sector and a second sector, wherein the first sector comprises four directional antennas corresponding to four radios of the plurality of radios of the second frequency, and wherein the second sector comprises two additional directional antennas selectively couple-able with the four radios of the plurality of radios of the second frequency.

9. The mesh network device of claim 4, wherein the first radio is coupled to an omnidirectional antenna and the plurality of radios comprises a second radio, a third radio, a fourth radio, and a fifth radio, each being configured to communicate via a separate one of four directional antennas, and each further being configured to communicate via two additional directional antennas, wherein the processing device is further to:

i) receive, via the first radio, a 2.4 GHz beacon frame from a second mesh network device, the 2.4 GHz beacon frame including a first informational element identifying the second mesh network device as an available access point in a wireless mesh network (WMN);

ii) listen, for a defined time period, on a first channel of the second radio, a first channel of the third radio, a first channel of the fourth radio, and a first channel of the fifth radio;

iii) repeat step ii) on a second channel, a third channel, and a fourth channel for each of the second radio, the third radio, the fourth radio, and the fifth radio;

iv) in response to steps ii) and iii), receive, via the second radio, a 5 GHz mesh frame from the second mesh network device, the 5 GHz mesh frame including an identifier (ID) of the second mesh network device;

v) compare the first informational element to the ID to determine a second sector identifier that identifies a first antenna from which the 5 GHz mesh frame is transmitted, a second RSSI value corresponding to the 5 GHz mesh frame, an unused radio and an unused channel of the second mesh network device, wherein the unused radio and the unused channel are not currently utilized by the second mesh network device;

vi) send a discovery request frame to the unused radio of the second mesh network device on the unused channel via each of the second radio, the third radio, the fourth radio, and the fifth radio, wherein during ii) and vi), the second radio is selectively coupled to the first one of the four directional antennas, the third radio is selectively coupled to the second one of the four directional antennas, the fourth radio is selectively coupled to the third one of the four directional antennas, and the fifth radio is selectively coupled to the fourth one of the four directional antennas;

vii) receive a locate probe from the second mesh network device on the unused channel, in response to the discovery request frame, via at least one of the first radio, the second radio, the third radio, or the fourth radio, the locate probe including a source sector identifier that identifies a second antenna from which the locate probe is transmitted; and viii) determine a third RSSI value corresponding to the locate probe.

10. The mesh network device of claim 9, wherein the processing device is further to:

ix) send a neighbor pairing request to the second mesh network device via the first radio, the neighbor pairing request comprising:

(1) a source sector identifier that identifies a source antenna at the mesh network device to exchange data with the second mesh network device, (2) a destination sector identifier at the second mesh network device to exchange the data with the mesh network device, (3) a channel identifier that identifies which of the first channel, the second channel, the third channel, or the fourth channel to exchange the data between the mesh network device and the second mesh network device, and (4) a media access control (MAC) address of the second radio, and a radio configuration table for the mesh network device;

x) receive a neighbor pairing response from the second mesh network device via the first radio, the neighbor pairing response to confirm establishment of a communication channel between the second radio of the mesh network device and first radio of the second mesh network device; and xi) repeat steps ix) and x) for a third mesh network device for the third radio, a fourth mesh network device for the fourth radio, and a fifth network device for the fifth radio.

11. The mesh network device of claim 9, wherein the processing device is further to:
   ix) scan for the 5 GHz mesh frame on the first channel of the second radio and the first channel of the third radio;
   x) send a second discovery request frame to the first radio of the second mesh network device on the unused channel via the second radio and the third radio, wherein during steps ix) and x), the second radio is selectively coupled to a fifth one of the two directional antennas and the third radio is selectively coupled to a sixth one of the two directional antennas;
   xi) receive a second response frame from the second mesh network device, in response to the second discovery request frame, via the unused channel on the unused radio of the second mesh network device, the response frame including a third source sector identifier that identifies an antenna from which the second response frame was transmitted;
   xii) determine a third RSSI value corresponding to the second response frame;
   xiii) update a radio configuration table associated with the mesh network device to include the third RSSI value; and
   xiv) repeat steps ix) through xiii) on the second channel, the third channel, and the fourth channel.

12. A method comprising:
   receiving, via a first radio of a first mesh network device, a first beacon frame from a second mesh network device;
   receiving, via a first of a plurality of radios of the first mesh network device, a first mesh frame identifying the second mesh network device;
   determining, by a processing device of the first mesh network device, from the first beacon frame or the first mesh frame, a first sector identifier that identifies an antenna from which the first mesh frame is transmitted, a first signal strength indicator (RSSI) value corresponding to the first mesh frame, an unused radio of the second mesh network device, and an unused channel of the second mesh network device;
   sending a first message to the unused radio of the second mesh network device on the unused channel via the first of the plurality of radios;
   receiving a second message from the second mesh network device via the first of the plurality of radios; and
   configuring, by the processing device, a first of the plurality of radios to communicate with the second mesh network device based on the second message.

13. The method of claim 12, further comprising:
   receiving, via the first radio, a second beacon frame from a third mesh network device, wherein the second beacon frame comprises a first identifier (ID) that identifies the third mesh network device; scanning, using the plurality of radios, for a second mesh frame corresponding to the third mesh network device;
   receiving, via the plurality of radios, the second mesh frame, wherein the second mesh frame comprises a second ID that identifies the third mesh network device;
   determining that the first ID and the second ID match; and
   determining a second sector identifier that identifies an antenna from which the second mesh frame was transmitted, a second RSSI value corresponding to the second mesh frame, an unused channel of the third mesh network device, wherein the second beacon frame identifies the unused radio of the third mesh network device.

14. The method of claim 13, wherein the second beacon frame comprises data about a node state corresponding to the third mesh network device, wherein the node state is one of: initializing (initing), discovering, linkable, linked, linkable radios connected, or linkable fully connected, further comprising:
   determining that the node state corresponding to the third mesh network device is linkable; and
   configuring a second of the plurality of radios to communicate with the third mesh network device based on the determination.

15. The method of claim 12, further comprising:
   determining a second RSSI value corresponding to the second message;
   configuring the first of the plurality of radios to communicate with a radio of the second mesh network device based on a highest RSSI value in a radio channel table associated with the first mesh network device, wherein the radio channel table comprises a list of neighbor mesh network devices, corresponding radios, and corresponding RSSI values;
   sending, via the first radio, a pairing request to the second mesh network device to pair the first of the plurality of radios to the radio of the second mesh network device, wherein the pairing request comprises the radio channel table;
   receiving, via the first radio, an indication that the pairing request was accepted by the second mesh network device; and
   updating the radio channel table to include pairing data associated with the pairing request.

16. The method of claim 12, further comprising a first sector and a second sector, wherein the first sector comprises four directional antennas corresponding to the plurality of radios, and wherein the second sector comprises two additional directional antennas selectively couple-able with the plurality of radios.

17. The method of claim 12, wherein the first radio is associated with a 2.4 GHz frequency and wherein the plurality of radios are associated with a 5 GHz frequency.

18. The method of claim 12, wherein the first radio is coupled to an omnidirectional antenna and the plurality of radios comprises a second radio, a third radio, a fourth radio, and a fifth radio, each being configured to communicate via a separate one of four directional antennas, and each radio further being configured to communicate via two additional directional antennas, further comprising:
   i) receiving, via the first radio, a 2.4 GHz beacon frame from a second mesh network device, the 2.4 GHz beacon frame including a first informational element identifying the second mesh network device as an available access point in a wireless mesh network (WMN);
   ii) listen, for a defined time period, on a first channel of the second radio, a first channel of the third radio, a first channel of the fourth radio, and a first channel of the fifth radio;
   iii) repeat step ii) on a second channel, a third channel, and a fourth channel for each of the second radio, the third radio, the fourth radio, and the fifth radio;
   iv) in response to steps ii) and iii), receive, via the second radio, a 5 GHz mesh frame from the second mesh network device, the 5 GHz mesh frame including an identifier (ID) of the second mesh network device;

v) comparing the first informational element to the ID to determine a second sector identifier that identifies a first antenna from which the 5 GHz mesh frame is transmitted, a second RSSI value corresponding to the 5 GHz mesh frame, an unused radio and an unused channel of the second mesh network device, wherein the unused radio and the unused channel are not currently utilized by the second mesh network device;

vi) sending a discovery request frame to the unused radio of the second mesh network device on the unused channel via each of the second radio, the third radio, the fourth radio, and the fifth radio, wherein during ii) and vi), the second radio is selectively coupled to the first one of the four directional antennas, the third radio is selectively coupled to the second one of the four directional antennas, the fourth radio is selectively coupled to the third one of the four directional antennas, and the fifth radio is selectively coupled to the fourth one of the four directional antennas;

vii) receiving a locate probe from the second mesh network device on the unused channel, in response to the discovery request frame, via at least one of the first radio, the second radio, the third radio, or the fourth radio, the locate probe including a source sector identifier that identifies a second antenna from which the locate probe is transmitted; and viii) determining a third RSSI value corresponding to the locate probe.

19. The method of claim 18, further comprising:

ix) sending a neighbor pairing request to the second mesh network device via the first radio, the neighbor pairing request comprising:
(1) a source sector identifier that identifies a source antenna at the mesh network device to exchange data with the second mesh network device,
(2) a destination sector identifier at the second mesh network device to exchange the data with the mesh network device,
(3) a channel identifier that identifies which of the first channel, the second channel, the third channel, or the fourth channel to exchange the data between the mesh network device and the second mesh network device, and
(4) a media access control (MAC) address of the second radio, and a radio configuration table for the mesh network device;

x) receiving a neighbor pairing response from the second mesh network device via the first radio, the neighbor pairing response to confirm establishment of a communication channel between the second radio of the mesh network device and first radio of the second mesh network device; and xi) repeating steps ix) and x) for a third mesh network device for the third radio, a fourth mesh network device for the fourth radio, and a fifth network device for the fifth radio.

20. The method of claim 19 further comprising:

ix) scanning for the 5 GHz mesh frame on the first channel of the second radio and the first channel of the third radio;

x) sending a second discovery request frame to the first radio of the second mesh network device on the unused channel via the second radio and the third radio, wherein during steps ix) and x), the second radio is selectively coupled to a fifth one of the two directional antennas and the third radio is selectively coupled to a sixth one of the two directional antennas;

xi) receiving a second response frame from the second mesh network device, in response to the second discovery request frame, via the unused channel on the unused radio of the second mesh network device, the response frame including a third source sector identifier that identifies from an antenna from which the second response frame is transmitted;

xii) determining a third RSSI value corresponding to the second response frame;

xiii) updating a radio configuration table associated with the mesh network device to include the third RSSI value; and xiv) repeating steps ix) through xiii) on the second channel, the third channel, and the fourth channel.

* * * * *